(12) United States Patent
Young et al.

(10) Patent No.: US 7,344,677 B2
(45) Date of Patent: Mar. 18, 2008

(54) HYDROGEN STORAGE ALLOYS HAVING IMPROVED CYCLE LIFE AND LOW TEMPERATURE OPERATING CHARACTERISTICS

(75) Inventors: Kwo Young, Troy, MI (US); Taihei Ouchi, Rochester, MI (US); Michael A. Fetcenko, Rochester, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 402 days.

(21) Appl. No.: 11/184,476

(22) Filed: Jul. 19, 2005

(65) Prior Publication Data

US 2005/0255382 A1    Nov. 17, 2005

Related U.S. Application Data

(63) Continuation-in-part of application No. 10/817,267, filed on Apr. 2, 2004.

(51) Int. Cl.
*H01M 4/58* (2006.01)
*C22C 19/03* (2006.01)

(52) U.S. Cl. .................. 420/455; 420/900; 429/40; 429/218.2

(58) Field of Classification Search ............. 420/416, 420/580, 900, 455; 423/248, 648.1; 96/108; 429/12, 40, 44, 218.1, 218.2, 220–226
See application file for complete search history.

(56) References Cited

U.S. PATENT DOCUMENTS 4,431,561 A * 2/1984 Ovshinsky et al. ......... 420/402
4,623,597 A * 11/1986 Sapru et al. ................ 429/101
4,716,088 A * 12/1987 Reichman et al. .......... 429/101
5,096,667 A * 3/1992 Fetcenko .................... 420/580
5,277,999 A * 1/1994 Ovshinsky et al. ........... 429/59
5,348,822 A * 9/1994 Ovshinsky et al. ......... 429/223
5,536,591 A * 7/1996 Fetcenko et al. ............. 429/59
5,616,432 A * 4/1997 Ovshinsky et al. ........... 429/59
5,637,423 A * 6/1997 Ovshinsky et al. ......... 429/223
5,840,440 A * 11/1998 Ovshinsky et al. ........... 429/60
5,905,003 A * 5/1999 Young et al. ............... 429/223
5,948,564 A * 9/1999 Ovshinsky et al. ......... 429/223
6,106,768 A * 8/2000 Lee et al. .................... 420/580
6,193,929 B1 * 2/2001 Ovshinsky et al. ......... 420/402
6,228,535 B1 * 5/2001 Fierro et al. ................ 429/223
6,270,719 B1 * 8/2001 Fetcenko et al. ........... 420/588
6,331,367 B1 * 12/2001 Ebihara et al. .......... 429/218.2
6,830,725 B2 * 12/2004 Fetcenko et al. ........... 420/580

* cited by examiner

*Primary Examiner*—Frank M. Lawrence
(74) *Attorney, Agent, or Firm*—David W. Schumaker

(57) ABSTRACT

A reversible hydrogen storage alloy for electrochemical and thermal hydrogen storage having excellent kinetics and improved performance at low temperatures and excellent cycle life. The compositions of the hydrogen storage alloy is modified to achieve excellent performance at low temperatures and excellent cycle life via non-stoichiometric hydrogen storage alloy compositions.

45 Claims, 14 Drawing Sheets

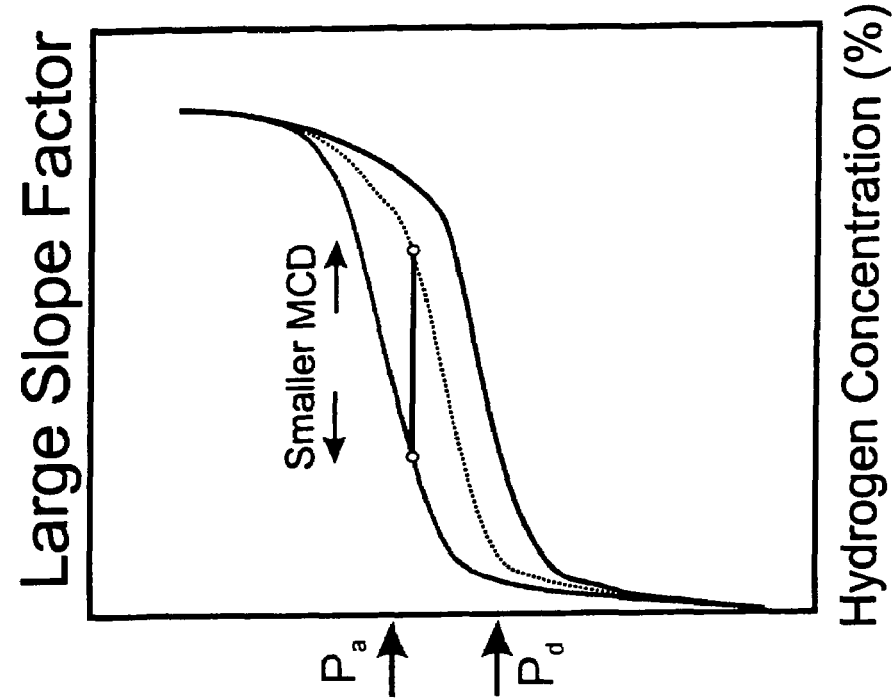
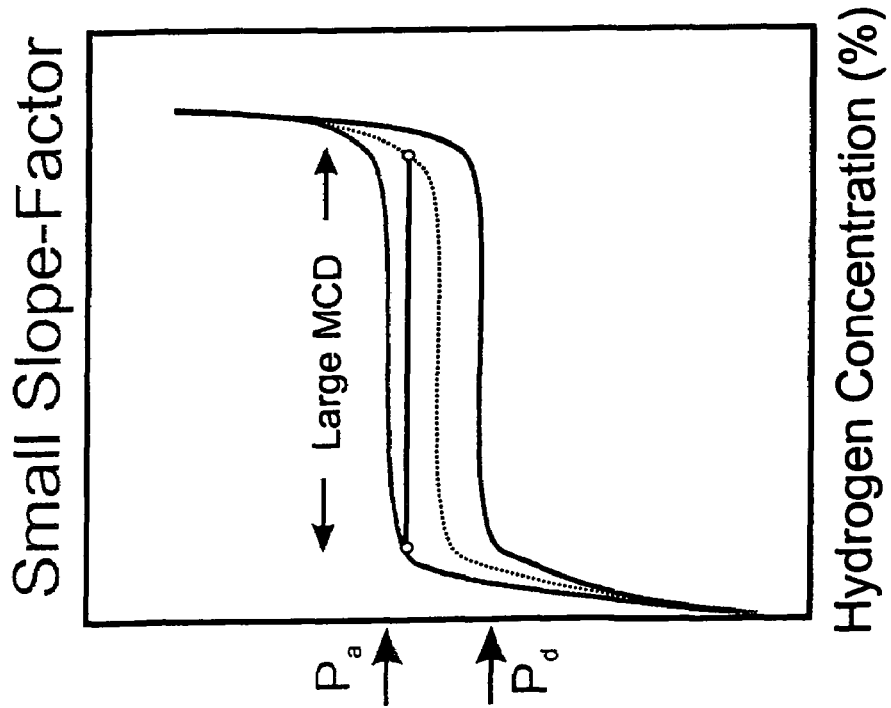
Fig. 6

PCT Measurement Result at 30°C
AB5 Material with High Zr

Fig. 12
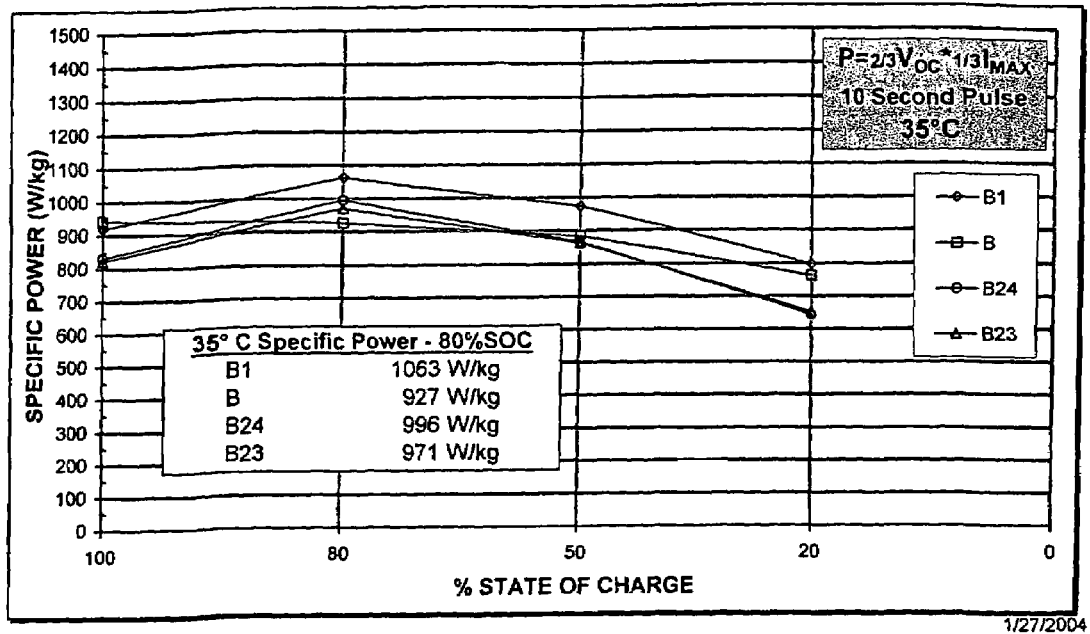
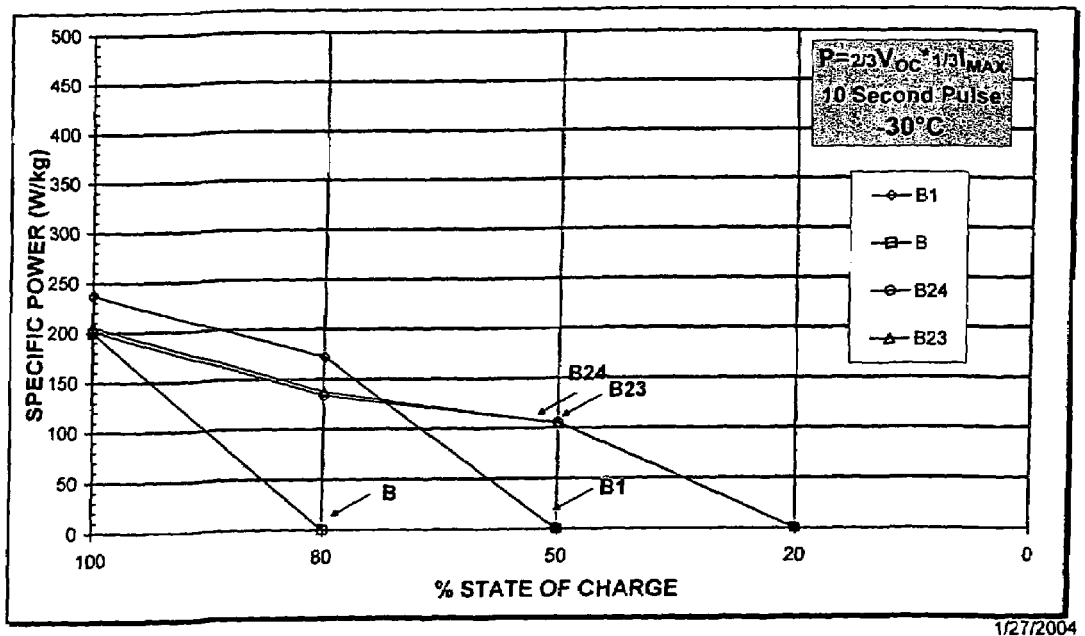

HYDROGEN STORAGE ALLOYS HAVING IMPROVED CYCLE LIFE AND LOW TEMPERATURE OPERATING CHARACTERISTICS

CROSS REFERENCE TO RELATED APPLICATIONS

The present application is a continuation-in-part of, and is entitled to the benefit of the earlier filing date and priority of, co-pending U.S. patent application Ser. No. 10/817,267, which is assigned to the same assignee as the current application, entitled "Hydrogen Storage Alloys Having Improved Cycle Life And Low Temperature Operating Characteristics, filed Apr. 2, 2004, for Fetcenko et al., the disclosure of which is hereby incorporated by reference.

FIELD OF THE INVENTION

The present invention relates to electrochemical and thermal hydrogen storage alloys utilized for the reversible storage of hydrogen. More particularly, the present invention relates to electrochemical and thermal hydrogen storage alloys having excellent kinetics at low temperatures and excellent cycle life.

BACKGROUND

Consumer and industrial applications continue to drive demand for new and efficient batteries for use as energy sources. Important goals include obtaining more power from increasingly smaller battery packages in an environmentally respectful fashion. Envisioned applications for batteries include everything from mobile electronics to electric vehicles. Portability, rechargeability over a large number of cycles, low cost, high power, lightweight and consistent performance over widely varying loads are among the key attributes required for batteries. The specific combination of battery performance requirements varies widely with the intended application and the battery components and materials are typically optimized accordingly.

An important developing application area for rechargeable batteries is electric vehicles (EV) and hybrid electric vehicles (HEV). In these applications, the battery must have the ability to provide high currents in short time periods in order to achieve effective acceleration. High-rate discharge capability is therefore necessary. High battery power over extended time periods is also needed so that vehicles of reasonable size and weight can be maintained in motion for reasonable time intervals without recharging. Rapid recharging over many cycles should also be possible using readily available electrical power sources. The preferred cycle life profile also requires a high number of charge/discharge cycles at a low, rather than high, depth of discharge for the HEV application. Progress has been made in the development of batteries for HEV applications and two HEV automobiles have recently been made available to the U.S. public. Nonetheless, the batteries used in these automobiles represent compromises and trade-offs in relevant performance parameters and new developments are needed to further extend the capabilities of HEV and EV products.

One aspect of rechargeable batteries for HEV, EV, 42 V SLI and other applications that has received relatively little attention is low temperature characteristics. For HEV and EV products it is desirable to have batteries that perform well in winter climates. Similarly, achievement of portable and stationary power sources based on rechargeable batteries that are capable of functioning outdoors in cold climates or in indoor cold environments is also desirable. A basic limitation of virtually every battery technology is a diminution of power and performance at low temperature. The deleterious effects of temperature are especially pronounced below freezing.

Nickel metal hydride batteries have emerged as the leading class of rechargeable batteries and are replacing earlier generation nickel-cadmium batteries in many applications. Current HEV and EV products, for example, utilize nickel metal hydride batteries and expanded performance of HEV and EV products in the future are expected to depend largely on the capabilities of nickel metal hydride batteries. Like other rechargeable batteries, nickel metal hydride batteries suffer significant degradation in power and performance upon a lowering of temperature. Improvements in the low temperature performance require consideration of the underlying components and principles of operation of nickel metal hydride batteries.

Nickel metal hydride batteries typically include a nickel hydroxide positive electrode, a negative electrode that incorporates a hydrogen storage alloy, a separator and an aqueous alkaline electrolyte. The positive and negative electrodes are housed in adjoining battery compartments that are typically separated by a non-woven, felled, nylon, polyethylene, or polypropylene separator. Several batteries may also be combined in series to form larger battery packs capable of providing higher powers, voltages or discharge rates.

The charging and discharging reactions of nickel metal hydride batteries have been discussed in the art and may be summarized as shown below:

Charging:
positive electrode: $Ni(OH)_2 + OH^- \rightarrow NiOOH + H_2O + e^-$
negative electrode: $M + H_2O + e^- \rightarrow MH + OH^-$
Discharging:
positive electrode: $NiOOH + H_2O + e^- \rightarrow Ni(OH)_2 + OH^-$
negative electrode: $MH + OH^- \rightarrow M + H_2O + e^-$ Much work has been completed over the past decade to improve the performance of nickel metal hydride batteries. Optimization of the batteries ultimately depends on controlling the rate, extent and efficiency of the charging and discharging reactions. Factors relevant to battery performance include the physical state, chemical composition, catalytic activity and other properties of the positive and negative electrode materials, the composition and concentration of the electrolyte, materials used as the separator, the operating conditions, and external environmental factors. Various factors related to the performance of the positive nickel hydroxide electrode have been considered, for example, in U.S. Pat. Nos. 5,348,822; 5,637,423; 5,905,003; 5,948,564; and 6,228,535 by the instant assignee, the disclosures of which are hereby incorporated by reference.

Work on suitable negative electrode materials has focused on intermetallic compounds as hydrogen storage alloys since the late 1950's when it was determined that the compound TiNi reversibly absorbed and desorbed hydrogen. Subsequent work has shown that intermetallic compounds having the general formulas AB, $AB_2$, $A_2B$ and $AB_5$, where A is a hydride forming element and B is a weak or non-hydride forming element, are able to reversibly absorb and desorb hydrogen. Consequently, most of the effort in developing negative electrodes has focused on hydrogen storage alloys having the AB, $AB_2$, $AB_5$ or $A_2B$ formula types.

Desirable properties of hydrogen storage alloys include: good hydrogen storage capabilities to achieve a high energy density and high battery capacity; thermodynamic properties suitable for the reversible absorption and desorption of hydrogen; low hydrogen equilibrium pressure; high electrochemical activity; fast discharge kinetics for high rate performance; high oxidation resistance; high resistance to cell self-discharge; and reproducible performance over many cycles. The chemical composition, physical state, electrode structure and battery configurations of hydrogen storage alloys as negative electrode materials in nickel metal hydride have been investigated and reported in the prior art. Some of this work is described in U.S. Pat. Nos. 4,716,088; 5,277,999; 5,536,591; 5,616,432; and 6,270,719 to the instant assignee, the disclosures of which are hereby incorporated by reference.

Efforts to date indicate that certain intermetallic compounds are capable of effectively functioning as negative electrode materials in rechargeable batteries, but that important properties are difficult to optimize simultaneously. Hydrogen storage alloys of the $AB_5$ type, for example, generally have easier initial activation, good charge stability and relatively long charge-discharge cycle life, but at the same time have relatively low discharge capacity. Furthermore, attempts to increase the cycle life generally lead to reductions in the initial activation. Hydrogen storage alloys of the $AB_2$ type, on the other hand, typically possess high discharge capacity, but low initial activation and relatively short cycle life. Efforts to improve upon the initial activation generally come at the expense of cycle life. Other important properties include discharge rate, discharge current, and constancy of energy or power delivery over time. It has proven difficult in most applications to simultaneously optimize all desired battery attributes and as a result, compromises are normally made in which some properties are sacrificed at the expense of others.

A need exists for improved rechargeable batteries having higher powers and discharge rates at low temperatures. With respect to nickel metal hydride batteries, the barrier to low temperature performance appears to reside primarily in the operating characteristics of the negative hydrogen storage alloy electrode. Consequently, a need exists for improving the performance of hydrogen storage alloys at low temperatures. New concepts in materials design are required to meet this need.

SUMMARY OF THE INVENTION

Disclosed herein, is a non-stoichiometric hydrogen storage alloy providing superior performance in low temperature operating environments and excellent cycle live. The hydrogen storage alloy is comprised of component A elements which are hydride forming elements and component B elements which are non-hydride forming elements. The non-stoichiometric hydrogen storage alloy has a pseudo B/A ratio in the range of 4.8 to 5.2, which quantifies the amount of non-hydriding B elements transferring to and occupying sites within the component A elements within the non-stoichiometric hydrogen storage alloy. The non-stoichiometric hydrogen storage alloy also has a c/a lattice constant ratio greater than or equal to 0.805. The non-stoichiometric hydrogen storage alloy may also have a hysteresis less than or equal to 0.12.

The non-stoichiometric hydrogen storage alloy may have the formula $AB_xCu_y$, wherein A is one or more elements selected from La, Ce, Pr, Nd, Mm (Mm is a combination of two or more rare earth elements), and other rare earth elements; and B is one or more elements selected from Ni, Mn, Co, Al, Cr, Ag, Pd, Rh, Sb, V, and Pt; $4.8 \leq x \leq 5.2$; and $0.01 \leq y \leq 0.35$. The addition of elements with a slightly larger atomic radius, such as Cu, to the non-stoichiometric hydrogen storage alloy causes B-site elements, such as Ni, to transfer over to and occupy A-sites in the non-stoichiometric hydrogen storage alloy. Depending on the amount of Cu added, the Ni transferred from the B-site to the A-site varies. Preferably, at least 35 percent of Ni may be transferred to A-sites from B-sites versus the total amount of Cu contained in the non-stoichiometric hydrogen storage alloy. More preferably, at least 45 percent of Ni may be transferred to A-sites from B-sites versus the total amount of Cu contained in the non-stoichiometric hydrogen storage alloy. The atomic ratio of copper to component B elements in the hydrogen alloy may be in the range of 0.01 to 0.20.

In one embodiment of the instant invention, the component A elements of the hydrogen storage alloy may comprise 60 to 65 atomic percent La, 24 to 28 atomic percent Ce, 2 to 4 atomic percent Nd, and 6 to 10 atomic percent Pr, the component B elements of the hydrogen storage alloy may comprise 78 to 84 atomic percent Ni, 4 to 8 atomic percent Co, 5 to 9 atomic percent Mn, and 4 to 8 atomic percent Al, and $0.18 \leq y \leq 0.30$.

In another embodiment of the instant invention, the hydrogen storage alloy described herein may be included in an anode active material for use in a negative electrode in an electrochemical cell. When included in an anode active material for use in a negative electrode in an electrochemical cell, the electrochemical cell may provide at least 20% of the peak power measured at 35° C. at temperatures less than or equal to –30° C.

BRIEF DESCRIPTION OF THE DRAWINGS

FIG. 6, shows a schematic depiction of PCT plots of alloys exhibiting large (a) and small (b) hysteresis along with an illustration of maximum concentration difference (MCD) as a measure of hysteresis.

FIG. 12, shows a comparison of the specific power as a function of the state of charge at 35° C. and –30° C. for C-cell batteries that include the B, B1 and instant B23 and B24 alloys as the active negative electrode material.

DETAILED DESCRIPTION OF THE PREFERRED EMBODIMENTS OF THE INVENTION

Figure 1:
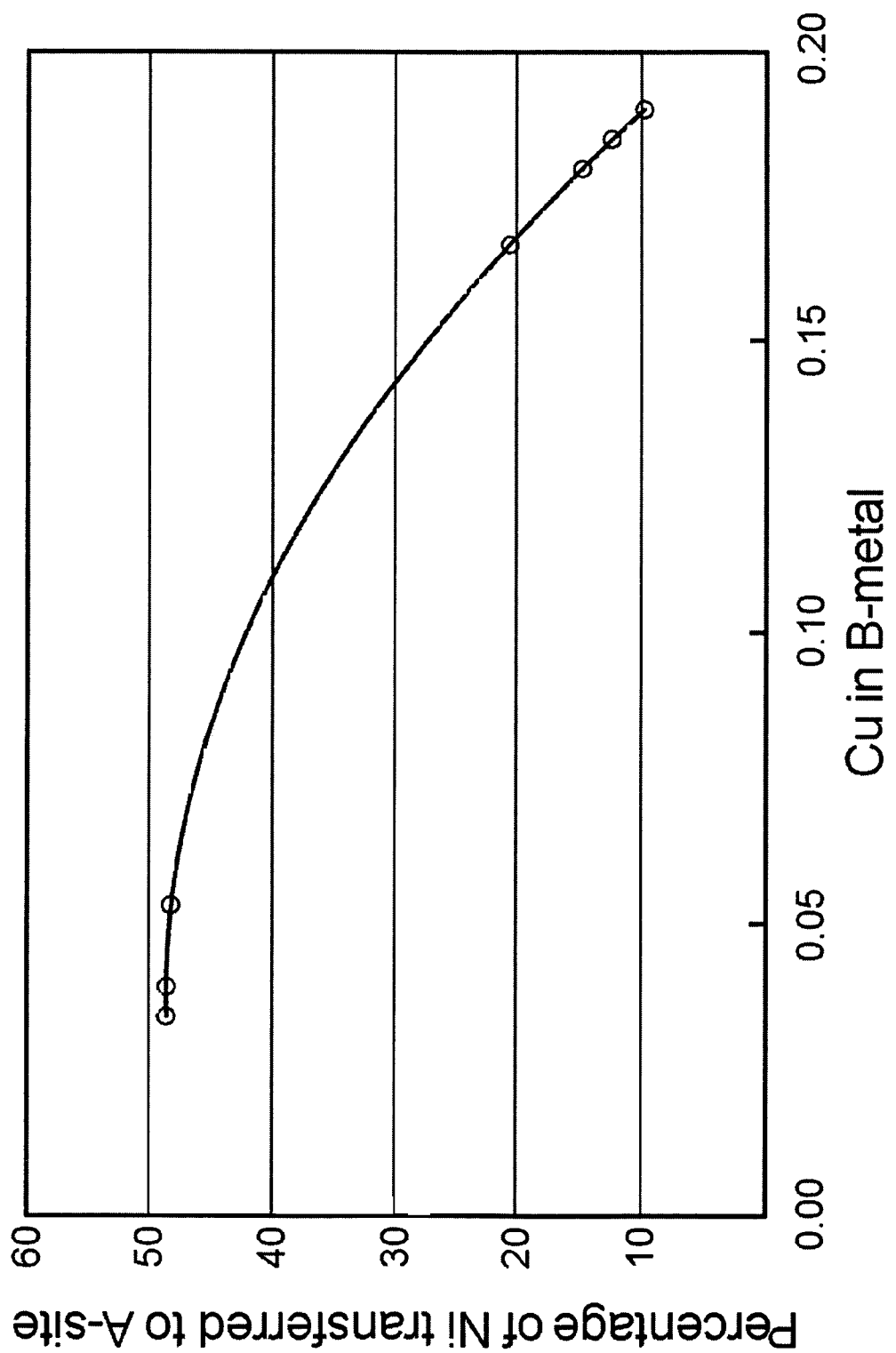
FIG. 1, shows the empirical function used to calculate the percentage of Ni in the A-sites of the alloys of the instant invention as a result of Cu addition from the ratio of Cu in the B-element.

The instant invention provides high porosity hydrogen storage alloys generally suitable for use as electrochemical or thermal hydrogen storage materials. The instant alloys may be used as the active material in electrodes for batteries, electrochemical cells (galvanic or electrolytic) or fuel cells. In a preferred embodiment, the instant hydrogen storage alloys are used as the negative electrode in a nickel metal hydride battery that provides superior performance in low temperature operating environments. The instant invention achieves improved performance through enhancement of the reaction kinetics of hydrogen storage alloys through modifications of the microstructure of the surface region.

Hydrogen storage alloys include catalytic sites and hydrogen storage sites. The catalytic sites typically form atomic hydrogen from hydrogen gas or water and the hydrogen storage sites typically store atomic hydrogen for later retrieval. The process of forming and storing atomic hydrogen may be referred to as charging the hydrogen storage alloy and the process of retrieving stored atomic hydrogen to form water, molecular hydrogen or some other species may be referred to as discharging the hydrogen storage alloy.

Hydrogen storage materials that can function using hydrogen gas as a source of hydrogen are referred to herein as thermal hydrogen storage materials. During hydriding of thermal hydrogen storage materials in a typical example, hydrogen gas adsorbs onto the surface of the material, is converted to atomic hydrogen by the catalytic sites, and the atomic hydrogen is stored in the hydrogen storage sites. The dehydriding of thermal hydrogen storage materials in this example includes release of atomic hydrogen from hydrogen storage sites and recombination of atomic hydrogen at the catalytic sites to form hydrogen gas.

Hydrogen storage materials that can function using water as a source of hydrogen are typically utilized in an electrochemical cell in an electrochemically driven process and are referred to herein as electrochemical hydrogen storage alloys. During charging of an electrochemical hydrogen storage alloy in a representative example, a current is provided to the hydrogen storage alloy in the presence of water to form a metal hydride and hydroxyl ions. The alloy is formally reduced in the charging process. The discharging of a metal hydride in this example involves the oxidation of the metal hydride in the presence of hydroxyl ions to form a metal or metal alloy and water. Electrons are produced during discharging to form a current.

In many cases, a particular material may function as both an electrochemical hydrogen storage material and a thermal hydrogen storage alloy. In such cases, the functionality is determined by the operating environment in which the material is employed.

U.S. Pat. No. 4,431,561 patent considers hydrogen storage alloys comprised of a matrix modified by modifier elements designed to store atomic hydrogen derived from hydrogen gas. The '561 patent teaches that the inclusion of modifying elements (e.g. certain transition metals or rare earths) alters the local chemical environments of the hydrogen storage matrix to provide a material having an increased density of hydrogen storage sites. As a result, the overall hydrogen storage capacity is improved.

U.S. Pat. No. 4,623,597 considers electrochemical hydrogen storage materials and teaches the use of modifying elements to manipulate the local chemical environment and structure of metals or metal alloys to achieve electrochemical hydrogen storage alloys that exhibit high charging and discharging efficiencies. The modifying elements are multi-orbital modifiers (e.g. transition metals having multiple d orbitals or rare earths having multiple f orbitals) that introduce disorder to the material through unique bonding configurations and orbital interactions to provide an increased number and range of hydrogen storage sites. Depending on the amount and chemical identity of the modifier, various manifestations of disorder are possible. Disorder in the form of polycrystalline, microcrystalline, intermediate range order or amorphous regions, for example, are possible as are compositional, topological, and positional disorders.

The disorder taught in the '597 patent also led to an increased density of catalytic sites thereby improving the charging and discharging processes. Conventional chemical catalysis is a surface phenomenon that occurs at surface irregularities such as dislocation sites, crystal steps, kinks, voids, impurities, defects etc. Since these surface irregularities are unintentional, their number is low and the overall catalytic efficiency is oftentimes unnecessarily low. Instead of relying on the accidental occurrence of surface irregularities, the '597 patent teaches formation and assembly of catalytic sites having varying degrees of activity and selectivity with respect to one or more reactions. In doing so, catalytic activity is not restricted to surfaces, but rather may become a bulk property of a material. As a result, the number of catalytic sites is increased beyond the number associated with unintentional surface irregularities. The topological freedom afforded by disordered and amorphous materials permits construction and strategic placement of local structural units or sites having desired catalytic performance in high numbers. The engineering of interactions between neighboring sites leads to materials whose catalytic performance is more than a simple superposition of individual contributing sites.

U.S. Pat. No. 5,840,440 considered the storage capacity of hydrogen storage alloys in further detail. Among the teachings of the '440-patent was a recognition of the degree to which the number of hydrogen storage sites needed to be increased in order to achieve substantial improvements in storage capacity. The '440 patent demonstrated a substantial increase in the number of hydrogen storage sites by introducing disorder and defects into a hydrogen storage material. In addition to conventional hydrogen storage sites, the '440 patent teaches the formation of non-conventional hydrogen storage sites where the number of non-conventional sites can be 50% or more of the number of conventional sites. The total hydrogen storage capacity is thereby increased. The '440 patent further taught the control of disorder and density of non-conventional storage sites through control of crystallite size. Smaller crystallite sizes were correlated with improved hydrogen storage capacity. Smaller crystallites are believed to include more topological disorder and a greater number of non-conventional storage sites. Other forms of disorder were further shown to provide non-conventional hydrogen storage sites. These forms of disorder include microstructures containing microcrystalline, nanocrystalline, amorphous, and multiphase regions.

The '561, '597, and '440 patents provided modified hydrogen storage alloys exhibiting greater numbers of catalytic and hydrogen storage sites. The teachings of those patents considered improvements with respect to the nominal or bulk composition of the hydrogen storage material and showed how catalytic and hydrogen storage sites need not be restricted to surfaces or the exterior portions of a hydrogen storage material, but could also be designed into interior portions by properly controlling disorder and topology. These advances led to significantly improved hydrogen storage alloys and concomitantly to better electrodes for batteries and fuel cells.

In U.S. Pat. No. 5,536,591 (the '591 patent), further advances in the catalytic performance of hydrogen storage alloys were considered. The '591 patent considers the compositional microstructure of hydrogen storage alloys in greater detail and recognizes that the composition of hydrogen storage alloys is more complicated than is indicated by the nominal or bulk composition. Specifically, the '591 patent recognizes the importance of a surface oxide layer that is typically present in hydrogen storage alloys and its influence on the charging and discharging processes. In electrochemically driven processes, for example, the oxide layer constitutes an interface between the electrolyte and the bulk hydrogen storage alloy and accordingly may also be referred to as an interface layer or region. Since oxide layers are typically insulating, they generally inhibit the performance of electrodes utilizing metals or metal alloys. Prior to electrochemical reaction, metal or metal alloy electrodes are typically activated, a process in which the surface oxide layer is removed, reduced or modified to improve catalytic characteristics. The process of activation may be accomplished, for example, by etching, electrical forming, preconditioning or other methods suitable for removing or altering excess oxides or hydroxides. See, for example, U.S. Pat. No. 4,717,088; the disclosure of which is hereby incorporated by reference.

The '591 patent disclosed modification of the oxide layer of hydrogen storage materials and thereby demonstrated improved catalytic activity. Specifically, hydrogen storage alloys having Ni-enriched catalytic regions in the oxide layer are shown to have high catalytic activity. The Ni-enriched catalytic regions may be prepared, for example, through an activation process in which elements of the hydrogen storage alloy other than Ni are preferentially corroded to provide metallic nickel alloy of about 50-70 Å distributed throughout the oxide layer. The Ni-enriched catalytic regions function as catalytic sites having high activity.

As discussed in U.S. Pat. No. 4,716,088 it is known that the steady state surface composition of V—Ti—Zr—Ni alloys can be characterized as having a relatively high concentration of metallic nickel. An aspect of the '591 patent is a significant increase in the frequency of occurrence of these nickel regions as well as a more pronounced localization of these regions. More specifically, the materials of the '591 patent have enriched nickel regions of 50-70 Å in diameter distributed throughout the oxide interface and varying in proximity from 2-300 Å, preferably 50-100 Å, from region to region. As a result of the increase in the frequency of occurrence of these nickel regions, the materials of the '591 patent exhibit increased catalysis and conductivity.

The increased density of Ni regions in the '591 patent provides powder particles having an enriched Ni surface. Prior to the '591 patent, Ni enrichment was attempted unsuccessfully using microencapsulation. The method of Ni microencapsulation results in the deposition of a layer of Ni about 100 Å thick at the metal-electrolyte interface. Such an amount is excessive and results in no improvement of performance characteristics.

The enriched Ni regions of the '591 patent can be formed via the following fabrication strategy: Specifically formulate an alloy having a surface region that is preferentially corroded during activation to produce the enriched Ni regions. Without wishing to be bound by theory, it is believed, for example that Ni is in association with an element such as Al at specific surface regions and that this element corrodes preferentially during activation, leaving the enriched Ni regions of the '591 patent. "Activation" as used herein and in the '591 patent refers to "etching" or other methods of removing excessive oxides, such as described in the '088 patent, as applied to electrode alloy powder, the finished electrode, or at any point in between in order to improve the hydrogen transfer rate.

The Ni-enriched catalytic regions of the '591 patent are discrete regions. The catalytic activity of the Ni-enriched catalytic regions is controllable by controlling the size, separation, chemical composition and local topology. In one embodiment of the '591 patent, the discrete Ni-enriched catalytic regions include metallic Ni particles having a diameter of 50-70 Å or less that are separated from each other by distances of 2-300 Å. The Ni-enriched catalytic regions are distributed throughout the oxide layer. The portions of the oxide layer surrounding the Ni-enriched catalytic regions or catalytic metallic Ni particles shall hereinafter be referred to as the support matrix, supporting matrix, supporting oxide, oxide support or the like. The Ni-enriched catalytic regions are thus supported by or within the support matrix. The support matrix may include fine and coarse grained oxides and/or hydroxides of one or more of the metallic elements present in the hydrogen storage alloy composition and may also include multiple phases, some of which may be microcrystalline, nanocrystalline or amorphous.

The supporting matrix and catalytic sites thereof are further discussed in U.S. Pat. No. 6,270,719 (the '719 patent). The '719 patent teaches additional modification of Ni-enriched regions to provide further improvements in catalytic activity. The '719 patent teaches formation of catalytically active metal-enriched regions comprising not only metallic Ni particles, but also particles of metal alloys such as alloys of Ni with one or more of Co, Cr, V, Pt, Pd, Au, Ag, Rh, Ti, Mn, or Al as well as other metal alloys (e.g. PtAu). The '719 patent further teaches that alloying may provide particles having an FCC structure instead of the BCC structure of the metallic Ni particles of the '591 patent.

The instant invention further considers the nature of the oxide support layer of hydrogen storage alloys and is particularly concerned with engineering the support matrix in order to obtain improved performance of electrochemical and thermal hydrogen storage alloys. The performance of hydrogen storage materials is based on factors that include the intrinsic activity of catalytic sites, the number of catalytic sites, interactions between catalytic sites, interactions between catalytic sites and hydrogen storage sites, the number of hydrogen storage sites and the stability of hydrogen storage sites. These factors influence the hydrogen storage capacity, thermodynamic properties, and kinetics of hydrogen storage materials. The '561, '597, '440, '591 and '719 patents described hereinabove have demonstrated various ways to improve the activity of catalytic sites, the number of catalytic sites, the number of hydrogen storage sites, and the stability of hydrogen storage sites.

The instant invention is directed at additional features of the support matrix and/or catalytic metallic regions or particles that are beneficial to the performance of hydrogen storage materials. More specifically, the instant invention is concerned with beneficial modifications of the region at or near the surface of a hydrogen storage alloy. The region at or near the surface of a hydrogen storage alloy may also be referred to herein as the surface or interface region, surface or interface layer, surface or interface oxide or the like. The surface or interface region constitutes an interface between the electrolyte and the bulk portion of an electrochemical hydrogen storage alloy. In one embodiment herein, the interface region includes catalytic metal or metal alloy particles having angstrom scale dimensions that are supported by a surrounding support matrix having a higher degree of porosity than with previously known metal hydride alloys. As described more fully hereinbelow, the relative proportions of catalytic metal or metal alloy particles and support matrix in the surface region vary with the composition and processing treatments of the instant hydrogen storage alloys.

One aspect of the instant invention focuses on tuning the microstructure of the support matrix in the interface region of hydrogen storage alloys so as to create a more open network structure that facilitates the access of reactant species to catalytic sites and the departure of product species away from catalytic sites through voids or channels in the interface region. Voids and channels of sufficient size relative to participating reactant species (in charging or discharging processes) facilitate the mobility of reactant species and may be referred to as reactant voids or channels. The presence of reactant voids or channels in the interface region of the instant alloys leads to greater utilization of catalytic sites and improved performance, particularly at low temperature. Another aspect of the instant invention focuses on tuning the microstructure of the interface region of hydrogen storage alloys so as to increase the density of catalytic sites. A greater number of catalytic sites in a given volume of hydrogen storage alloy leads to an increase in overall catalytic reactivity. Another aspect of the instant invention focuses on modification of the crystal structure of hydrogen storage alloys through non-stoichiometric compositions resulting in the transfer of atoms from B-sites to A-sites. The transfer of atoms from B-sites to A-sites through non-stoichiometry modifies the crystal structure thereby reducing hysteresis between hydrogen absorption/desorption and increasing the cycle life of the hydrogen storage alloy.

The beneficial microstructure tuning effects present in the instant hydrogen storage alloys may be achieved through inclusion of a microstructure tuning element in the alloy composition, through control of one or more alloy processing parameters (e.g. heat treatment temperature, processing ambient, time of contact with air etc.), through inclusion of one or more etching steps during processing or after alloy formation or a combination of the above. In a preferred embodiment, microstructure tuning according to the instant invention provides a hydrogen storage alloy having a high density of catalytic sites surrounded by a support matrix having a high degree of porosity so that the mobility of reactant and product species in the vicinity of catalytic sites is substantially unimpeded.

In one embodiment, the instant hydrogen storage materials include a base alloy that is designed to have a formula capable of expanding on the preferential corrosion of the '591 patent to not only allow the formation of metallic nickel alloy regions distributed throughout the oxide, but to further preferentially corrode to create a high porosity pore network within the oxide to create greater accessibility to the catalysts. Formula modifiers modify the porosity of the support matrix and/or the density of catalytic sites within the surface region of a base alloy. Porosity modification may occur during alloy formation, post-formation processing, activation or during operation as an electrochemical or thermal hydrogen storage alloy. The formula modifiers of the instant invention may hereinafter be referred to as modifying elements, microstructure tuning elements, microstructure modifiers, support matrix modifiers, supporting oxide modifiers, surface or interface region modifiers or the like. The presence of the formula modifiers in combination with other elements provide an overall alloy formulation that provides the beneficial microstructural and porosity effects of the instant invention.

In another embodiment, a high porosity support matrix is obtained through proper control of processing parameters during formation, annealing, processing or operation of a hydrogen storage alloy. In still another embodiment, etching steps applied after alloy formation provide a high porosity support matrix. Etching steps may include basic and/or acidic etching processes designed to selectively or preferentially etch one or more elements or oxides or hydroxides thereof in the interface region of a hydrogen storage alloy thereby rendering the interface region more porous.

In the absence of microstructure tuning according to the instant invention, the base alloys may have metal enriched catalytic regions that include catalytically active particles comprised of nickel, nickel alloy as well as other metals or metal alloys as described in the '591 and '719 patents. As described more fully hereinbelow, microstructure tuning according to the instant invention permits control of the porosity of the support matrix surrounding the catalytically active particles and thereby enhances the mobility of relevant molecules or molecular species in electrochemical or thermal charging or discharging processes with respect to the support matrix. The microstructure of the instant alloys have high porosity surface regions that include voids or channels that facilitate access of reactant species within the surface region as well as to and from catalytic particles or regions. The instant voids or channels may thus be viewed as reactant voids or reactant channels. The instant microstructure tuning may also provide a higher density of catalytic metallic particles in the interface region of the instant hydrogen storage materials. The instant microstructure tuning leads to better charging and/or discharging kinetics, especially at low temperatures, as shown in several examples presented hereinbelow. The characteristics and range of modifications of the support matrix surrounding the catalytic metal-enriched regions of the hydrogen storage materials described in the '591 and '719 patents have not been fully optimized in the prior art. Incidental variations of the support matrix as a result of effects intended to improve the performance or number of catalytic and hydrogen storage sites have been mentioned, but little teaching of the intentional modification of the support matrix has been presented. In the '591 patent, for example, formation of Ni-enriched regions was believed to provide a somewhat more porous supporting oxide. In the '719 patent, as another example, inclusion of Mn in the bulk composition of the hydrogen storage alloy was proposed to provide a multivalent $MnO_x$ component to the oxide layer where the multivalent component may have catalytic properties.

While not wishing to be bound by theory, the instant inventors believe that the supporting oxide of the prior art hydrogen storage alloys is dense and that a dense oxide support is detrimental to the performance of hydrogen storage alloys, particularly at low temperatures. Even though better porosity is expected in the materials of the '591 patent, it is believed that the supporting oxide is still sufficiently dense, even in these materials, to inhibit performance. The instant inventors believe that performance may be improved by generally increasing the porosity of the supporting oxide and with the instant invention, chemical modification and total interactive environment to the microstructural tuning of the supporting matrix surrounding catalytic metallic particles or other catalytically enriched regions of a hydrogen storage alloy. Tuning of the porosity of the matrix supporting metal enriched catalytic regions represents an additional degree of freedom for optimizing the performance of electrochemical and thermal hydrogen storage materials. In addition to the intrinsic activity, number, and interactions among and between catalytic sites, hydrogen storage sites and surrounding material described hereinabove, high performance further requires that a hydrogen bearing source such as hydrogen gas or water has accessibility to a catalytic site. The concept of accessibility further extends to the ability of byproducts formed during charging or products formed during discharging to depart catalytic sites so that the site may be further utilized.

As an example, an electrochemical hydrogen storage alloy that includes metal enriched catalytic regions may be considered wherein the alloy is included as the negative electrode of a rechargeable battery in the presence of an aqueous electrolyte. Upon charging, water accesses a metal enriched catalytic site to form atomic hydrogen for storage and a hydroxyl ion byproduct. In order for this charging process to occur, the support matrix surrounding metal enriched catalytic sites must be sufficiently open or porous to permit water molecules from the electrolyte to access the metal enriched catalytic sites. Additionally, in order to continually effect catalysis at a metal enriched catalytic site, the support matrix must permit hydroxyl ion formed during charging to migrate, diffuse or otherwise depart from the catalytic site so that the access of further water molecules to the catalytic site is not impeded or otherwise blocked by the presence of a hydroxyl ion. Similar considerations apply on discharging. Upon discharging, stored hydrogen combines with hydroxyl ions at a catalytic site to form water. In order to achieve high discharge rates, it is preferable for the support matrix to be sufficiently porous to allow for the facile departure of water molecules formed upon discharging away from the catalytic site. If the departure of water molecules is inhibited by the support matrix, the catalytic site is effectively blocked and additional discharging may be inhibited. Optimal discharging requires not only rapid formation of product, but also rapid departure or transport of products (and byproducts, if present) away from the catalytic site so that the site is available for further participation in the discharge reaction. In addition to reactants, products and by-products, the accessibility and mobility of ions in the electrolyte to catalytic sites, hydrogen storage sites and within a hydrogen storage material may also be relevant to the overall performance and efficiency of charging and discharging reactions.

Insufficient porosity of the support matrix may inhibit access to or departure from catalytic sites, for example, by presenting a structure having openings or channels that are too small to provide facile migration of molecular species to and/or from a catalytic site. Thus, even if a particular catalytic site (e.g. within a metal enriched catalytic region or catalytic metallic particle) has high activity, fast kinetics for charging and discharging etc., inability of reactant molecules or electrolyte species to access the catalytic site or inability of product molecules or electrolyte species to depart the catalytic sites may have a deleterious effect on the performance of a hydrogen storage material.

In addition to structural barriers associated with accessing or departing a catalytic site, a supporting matrix may also present steric, electronic or other barriers. Electronic barriers generally arise from intermolecular forces of attraction or repulsion that may be present between the support matrix and migrating or diffusing molecules or chemical species. Electrostatic, van der Waals, bonding, etc. interactions may act to impede migration or diffusion even if sufficiently large structural pathways for migration are available within the support matrix. The concept of porosity as used herein is intended to broadly encompass barriers or inhibitions, regardless of origin, provided by the support matrix to the migration or diffusion of species participating in charging or discharging processes. A highly porous support matrix provides few barriers to migration or diffusion, while a low porosity or highly dense support matrix provides substantial barriers to migration or diffusion.

The ability of a molecule or other chemical species to access or depart a catalytic site may also be referred to as the mobility of the molecule within or with respect to the support matrix. A molecule or chemical species having high mobility is readily able to penetrate, migrate through, diffuse within or otherwise transport through or within the support matrix. High mobility implies greater accessibility of reactants to catalytic sites during charging and greater ability of products to depart from a catalytic site during discharging. High mobility also implies a greater ability of byproducts to depart from a catalytic site during either or both of charging and discharging. High mobility of a species through a support matrix implies that the support matrix provides few barriers (structurally, sterically, electronically etc.) to migration or diffusion. The transport of electrolyte species is similarly facilitated through a support matrix that provides high mobility.

Phenomenologically, species mobility and accessibility to catalytic sites may be manifested in the charge transfer resistance, particularly at low temperature, of an electrochemically driven process. Charge transfer resistance is a measure of the facility of the basic electrodic electron transfer process of an electrochemical reaction. A high charge transfer resistance implies an inhibited electron transfer process. Factors contributing to an inhibition include low number of catalytic sites, low activity of catalytic sites or inability of relevant molecules and molecular species to access or depart catalytic sites. A highly dense oxide support matrix inhibits the charge transfer process by impeding access to and/or departure from a catalytic site. This inhibition contributes to a large charge transfer resistance and slows the kinetics of an electrochemical process. As the porosity of the support matrix increases, the charge transfer resistance decreases as species mobility and accessibility to catalytic sites improves. At sufficient porosity, the support matrix is no longer the dominating factor in determining the charge transfer resistance. Instead, the number and/or activity of catalytic sites or the concentration of reactive species may become controlling.

The mobility of a molecule or other molecular species with respect to a support matrix may be influenced by external factors such as the temperature. Temperature is a relevant consideration because it controls the thermal energy of a molecule. Higher temperatures provide higher thermal energies to molecules and molecular species that access or depart from a catalytic site thereby better enabling them to overcome structural, steric, electronic or other barriers to mobility provided by a support matrix. A support matrix that provides sufficient mobility at one temperature with respect to a particular charging or discharging process may not provide sufficient mobility at a lower temperature because of a reduction of thermal energy available to one or more molecules or molecular species requiring access to or departure from a catalytic region. The thermal energy of mobile molecules or species relative to the activation energies of barriers to mobility provided by the support matrix influences the effectiveness of charging and discharging.

In the instant invention, hydrogen storage materials having tailored support matrix porosity that enhances the mobility of relevant molecules and molecular species are provided. Mobility enhancements are provided at elevated temperatures, room temperature and low temperatures. Mobility enhancements are provided by the inclusion or formation of reactant voids or channels in the surface region of the instant alloys having a sufficient size and number to facilitate migration, diffusion, etc. of participating species within the surface region as well as to or from catalytic and/or hydrogen storage sites within the alloy. In a preferred embodiment, an instant hydrogen storage material is utilized as the active material in the negative electrode of a nickel metal hydride battery that provides superior discharge kinetics at temperatures below 0° C. In one embodiment, a nickel metal hydride battery that provides superior discharge kinetics at −30° C. is provided.

Achievement of a high porosity support matrix may be achieved, for example, through a preferential corrosion of the surface layer. The surface layer is typically a multicomponent oxidic phase that includes oxides or hydroxides of one or more of the metals present in the formula of a hydrogen storage alloy. Oxides or hydroxides based on different metals exhibit different degrees of corrosion in an electrochemical cell during alloy processing, activation and/or operation. While not wishing to be bound by theory, the instant inventors believe that microstructure tuning according to the instant invention facilitates an accelerated and directed preferential corrosion of the surface oxide layer. In one embodiment herein, microstructure tuning according to the instant invention is provided through the inclusion of formula modifiers, which may be referred to as microstructure tuning element, in the alloy composition. According to the accelerated and directed preferential corrosion effect in this embodiment, corrosion effects ordinarily encountered during activation and/or operation of an electrochemical cell may become exaggerated in the presence of a microstructure tuning element and as a result, a more porous support matrix is formed. In other embodiments, accelerated and preferential corrosion may occur or be facilitated in later processing through control of processing parameters during alloy formation, annealing, treatment, or operation or through inclusion of basic and/or acidic etching steps upon or during alloy formation.

In addition to porosity modifications, accelerated and directed preferential corrosion may also lead to a relative local enhancement, at or in the vicinity of the surface, of the concentration of one or more elements that are less susceptible to corrosion. As in the '591 and '719 patents incorporated by reference hereinabove, local enhancements in the concentrations of one or more metals may facilitate the formation of metal enriched regions that include catalytic metallic particles. The instant microstructure tuning, with its ability to effect exaggerated corrosion, may thus provide for a substantially increased density of catalytic metallic particles in the instant hydrogen storage alloys relative to the alloys described in the '591 or '719 patents.

While not wishing to be bound by theory, the instant inventors believe that the porosity modifications and/or increased density of catalytic metallic particles afforded by the instant microstructure tuning may, at least in some embodiments of the instant hydrogen storage alloys, occur synergistically. That is, an increase in the porosity of the support matrix may promote the formation of catalytic metallic particles and vice versa. Effects associated with the accelerated and directed preferential corrosion in the presence of microstructure tuning according to the instant invention include a reduction in the amount of oxide support matrix and an increase in the local concentration of less corrosive elements at and in the vicinity of the surface of the instant hydrogen storage alloys. The tendency for exaggerated corrosion has the effect of substantially reducing the amount of the oxide matrix available to support catalytic metallic particles. As the oxide matrix is corroded, the local oxygen concentration decreases. As a result, the tendency of the more highly localized less corrosive elements that remain at or in the vicinity of the surface to form metallic particles (instead of, for example, metal oxides) is enhanced. Furthermore, since the surrounding oxide matrix is corrosively depleted and may not be substantially available to provide support to the greater density of metallic particles that form, it is believed that the metallic particles may become substantially self supporting by, for example, forming a contiguous particulate network in which individual metallic particles become interconnected to form an at least partially non-oxidic support matrix. Rather than merely providing local metal enriched regions that include catalytic particles supported on an oxide matrix as in the '591 patent, the instant invention may provide a support matrix that is in itself catalytic and comprised of an assembly of substantially self-supported catalytic metallic particles.

In the instant invention, the concentration of the microstructure tuning element in the composition or the degree of microstructure tuning of the instant alloys influences the relative abundance of oxide-supported and self-supported catalytic metallic particles as well as the void or channel volume in the interface region. When the concentration of the microstructure tuning element or degree of microstructure tuning according to the instant invention is low, the catalytic metallic particles are expected to form at a lower concentration and to be substantially supported by a relative dense oxide matrix. The catalytic metallic particles under these conditions are expected to be well separated and surrounded by a relatively dense and lightly porous support matrix. As the concentration of the microstructure tuning element increases, the support matrix becomes increasingly porous due to the accelerated and directed preferential corrosion effect described hereinabove. As the support matrix becomes less abundant in the vicinity of the catalytic metallic particles, it is less able to support those particles and the tendency of the catalytic metallic particles to become self-supporting increases. The proportion of self-supported catalytic metallic particles increases, while the proportion of oxide supported catalytic metallic particles decreases. The tendency of the less corrosive elements to form catalytic metallic particles also increases and is expected to lead to catalytic metallic particles that occur at higher density and with smaller separations.

When the concentration of the microstructure tuning element or degree of microstructure tuning according to the instant invention is intermediate, the region at or in the vicinity of the surface of the instant hydrogen storage alloys includes both self-supported and oxide supported catalytic metallic particles with the porosity of the remaining oxide increasing as the concentration of microstructure tuning element increases. When the concentration of microstructure tuning element or degree of microstructure tuning according to the instant invention is high, the catalytic metallic particles become substantially self-supporting. An oxidic matrix may remain, but would be of low density and only secondarily involved in supporting the catalytic metallic particles.

The porosity of the surface region may be expressed in terms of a pore volume fraction or void volume fraction where a pore or void corresponds to an opening or open portion of the surface region. A pore or void may be localized or extended in the hydrogen storage material and include, for example, channels. While not wishing to be bound by theory, the instant inventors believe that an initial effect of microstructure tuning according to the instant invention is void formation or enlargement in the general vicinity of catalytic metallic particle. In this initial effect, microstructure tuning according to the instant invention facilitate corrosion locally in a hydrogen storage material at positions that are separated from each other. Concomitant depletion of the support matrix and formation of a metallic particle at a site of corrosion leads to a consolidation of one or more of the metals of the oxidic support matrix to form a metallic particle as well as to removal of oxygen and the more highly corrodable metals in the vicinity of a metallic particle. The local environment at a site of corrosion thus includes a metallic particle and a void. The size of the void depends on the volume of the metallic particle formed, the amount of material removed, and the response of the hydrogen storage material to void formation. A void represents an unoccupied, open, non-dense region of a hydrogen storage material. Voids correspond to defects in the hydrogen storage material and are regions of weak mechanical strength that may facilitate a collapse or densification of the interface region. A densification may occur due to a reduced resistance to the deformation of atoms adjacent to a void that results upon removal of atoms to form a void. Atoms that formerly occupied a void provide mechanical resistance to the deformation of neighboring atoms. Upon removal of these atoms through corrosion, the resistance to deformation is removed and as a result, a hydrogen storage material may collapse to fill in the void. The extent to which a hydrogen storage material collapses depends on the mechanical strength of the material surrounding a void as well as on the thermodynamics and kinetics of the atomic displacement processes associated with collapse. Substantial collapse leads to a reduction in pore volume and inhibited mobility of molecules and chemical species in the interface region.

While not wishing to be bound by theory, the instant inventors believe that microstructure tuning according to the instant invention inhibits collapse of the interface region upon formation of voids so that void volume is increased and mobility of molecules and chemical species through and near voids is promoted. In one model, the instant inventors believe that microstructure tuning according to the instant invention increases the rate of formation of catalytic metallic particles to such a degree that catalytic metallic particles form on timescales faster than those required for the collapse of the surrounding support material needed to fill in a void. In this model, high void volumes are kinetically "frozen" or retained in the interface region. The consequences of this model include the formation or retention of voids that have sizes comparable to or larger than the sizes of the catalytic metallic particles.

As indicated hereinabove, an initial effect of microstructure tuning according to the instant invention is void formation in the vicinity of catalytic metallic particles in the interface region where voids are relatively isolated from each other. In a preferred embodiment, the instant hydrogen storage alloys comprise an $AB_5$ base alloy that has been modified with a cycle life enhancement element to achieve improved cycle life. In a most preferred embodiment, the instant hydrogen storage alloys comprise an $AB_5$ base alloy that has been modified by a microstructure tuning element according to U.S. Pat. No. 6,830,725 ('725) and further modified in accordance with the instant invention with a cycle life enhancement element. As indicated hereinabove, the preferred microstructure tuning elements according to the '725 patent are Cu, Fe, Sn, Zn or combinations thereof where the microstructure tuning element preferably enters the B site of an $AB_5$ structure. The most preferred cycle life enhancement elements according to the instant invention, in combination with reduced cobalt concentration, and addition of copper, are Zr and Si. Other cycle life enhancement elements according to the instant invention include Sc, Mg, Ca, Ti, V and Cr. In this embodiment, the instant alloys include alloys having a bulk region and an interface region where the interface region includes catalytic metallic particles supported by a support matrix and voids and channels as described in the '725 patent. In a preferred embodiment, the catalytic metallic particles have diameters of less than about 100 Å and are distributed along with voids or channels throughout the interface region where the volume fraction of void or channels is greater than 5%. In another embodiment herein, the void or channel volume fraction is greater than 10%. In still another embodiment herein, the void or channel volume fraction is greater than 15%. In yet another embodiment herein, the void or channel volume fraction is greater than 20%.

In another embodiment, the instant alloys include alloys having a bulk region and an interface region where the interface region includes catalytic metallic particles supported by a support matrix as described in the '591 and '667 patents where the alloy has been further modified in through the inclusion of a cycle life enhancement element according to the instant invention. In this embodiment, the catalytic metallic particles preferably have diameters of less than about 100 Å. In another preferred embodiment, the catalytic metallic particles are 50-70 Å in diameter and separated by 2-300 Å or more preferably 50-100 Å. In a preferred embodiment, the volume fraction of catalytic metallic particles is greater than 30% and in a more preferred embodiment, the volume fraction of catalytic metallic particles is greater than 50%.

As microstructure tuning according to the instant invention progresses and becomes more pronounced (e.g. by increasing the concentration of a microstructure tuning element, using more prolonged or stronger etches, etc.), the number of metallic particles formed, the volume fraction of voids and/or the porosity of the interface region increase. Eventually, neighboring voids will overlap to form extended void structures such as channels or platelets may form to provide continuous openings that extend throughout the interface region. As the porosity of the support matrix increases, a porosity network that includes one or more of voids, platelets and channels is formed locally and throughout the interface region. The instant formula modifier elements in one embodiment herein include transition metals and post-transition metals. In one embodiment, Sn or Zn is used as a porosity modifier. In a preferred embodiment, Fe is used as a porosity modifier. In a most preferred embodiment, Cu is used as a porosity modifier. The general approach is to view the allow formula as a whole. Preferential corrosion requires that a spectrum of elements exist, some that oxidize and corrode, others that oxidize and passivate and others that remain metallic. Most preferably, there are multiple elements in the corrosion and passivation categories giving greater diversity of rates. In this context, the above mentioned modifiers (Cu, Fe, Sn, Zn) might actually work against the desired microstructural and porosity properties if they were combined with a base alloy already too high in corroding species. Other elements that may assist in the proposed invention include Al, Si and V. Embodiments including one or more porosity modifiers are within the scope of the instant invention.

A key is to provide access voids to the catalyst. It is possible that non-modifier element approaches may also operate to provide the beneficial microstructural and porosity effects of the instant invention, such as chemical pretreatments designed to selectively attack one or more of the support oxide elements. For example, HF may provide the final desired oxide porosity.

Hydrogen storage materials suitable for microstructure tuning according to the instant invention include base hydrogen storage alloys comprising one or more transition metals or rare earths as well as base alloys in combination with a microstructure tuning element. Base alloys having the formula types AB, $AB_2$, $AB_5$, $A_2B_7$, or $A_2B$ and mixtures thereof are within the scope of the instant invention where components A and B may be transition metals, rare earths or combinations thereof in which component A generally has a stronger tendency to form hydrides than component B.

In the base AB hydrogen storage compositions, A is preferably Ti, Zr, V or mixtures or alloys thereof and B is preferably selected from the group consisting of Ni, V, Cr, Co, Mn, Mo, Nb, Al, Mg, Ag, Zn or Pd and mixtures or alloys thereof. Base AB compositions include ZrNi, ZrCo, TiNi, and TiCo as well as modified forms thereof. Representative base AB compositions and modified forms thereof within the scope of the instant invention include those described in U.S. Pat. Nos. 4,623,597; 5,840,440; 5,536,591; and 6,270,719 incorporated by reference hereinabove as well as in U.S. Pat. No. 5,096,667; the disclosure of which is hereby incorporated by reference.

Base $A_2B$ compositions include $Mg_2Ni$ as well as modified forms thereof in which either or both of Mg and Ni is wholly or partially replaced by a multi-orbital modifier.

Base $AB_2$ compositions are Laves phase compounds and include compositions in which A is Zr, Ti or mixtures or alloys thereof and B is Ni, V, Cr, Mn, Co, Mo, Ta, Nb or mixtures or alloys thereof. The instant invention also includes base $AB_2$ compositions modified as described hereinabove. Representative base $AB_2$ compositions within the scope of the instant invention are discussed in U.S. Pat. No. 5,096,667 incorporated by reference hereinabove.

Base $AB_5$ compositions include those in which A is a lanthanide element or a mixture or alloy thereof and B is a transition metal element or a mixture or alloy thereof. $LaNi_5$ is the prototypical base $AB_5$ compound and has been modified in various ways to improve its properties. Ni may be partially replaced by elements including Mn, Co, Al, Cr, Ag, Pd, Rh, Sb, V, or Pt, including combinations thereof. La may be partially replaced by elements including Ce, Pr, Nd, or other rare earths including combinations thereof. Mischmetal may also wholly or partially replace La. Mg may be added to the $AB_5$ matrix to form $A_2B_7$ compounds. The instant invention also includes base $AB_5$ compositions modified as described hereinabove. Representative base $AB_5$ compositions within the scope of the instant invention have been discussed in U.S. Pat. Nos. 5,096,667 and 5,536,591 incorporated by reference hereinabove.

Modified Mg-based alloys such as those described in U.S. Pat. Nos. 5,616,432 and 6,193,929, the disclosures of which are hereby incorporated by reference, are also within the scope of the instant invention.

The base alloys of the instant invention may also comprise multiphase materials where a multiphase material is a combination or mixture of materials having different stoichiometries, microstructures and/or structural phases. Structural phases include crystalline phases, microcrystalline phases, nanocrystalline phases and amorphous phases.

In some embodiments, increased support matrix porosity and/or increased density of catalytic metallic particles results from inclusion of a modifying element in the base alloy composition. In other embodiments, inclusion of a modifying element in combination with a reduction in the amount of one or more elements of the base alloy composition provides increased porosity of the support matrix and/or increased density of catalytic metallic particles. In still other embodiments, microstructure tuning occurs through formation, processing, treatment, activation or operation steps as described hereinabove.

The base alloys of the instant invention may comprise non-stoichiometric compositions. Non-stoichiometric compositions are compositions in which the ratio of elements may not be expressible in terms of simple ratios of small whole numbers. Non-stoichiometric compositions are defined herein as being under-stoichiometric or over-stoichiometric compositions. Representative non-stoichiometric compositions include $AB_{1\pm x}$, $AB_{2\pm x}$, $AB_{5\pm x}$, and $A_2B_{1\pm x}$ where x is a non-integer and a measure of the non-stoichiometric compositional deviation.

An embodiment of the non-stoichiometric $AB_5$ hydrogen storage alloys of the instant invention may be characterized by the formula $AB_xCu_y$, wherein $4.8 \leq x \leq 5.2$ and $0.01 \leq y \leq 0.35$. Preferably, $4.9 \leq x \leq 5.1$. Most preferably, $4.95 \leq x \leq 5.05$. Preferably, $0.15 \leq y \leq 0.30$. Component A may be selected from one or more rare earth elements selected from La, Ce, Pr, Nd, Mm (Misch metal), and other rare earth metals and component B may be selected from one or more elements selected from Ni, Mn, Co, Al, Cr, Ag, Pd, Rh, Sb, V, and Pt, wherein portions of one or more component B elements may transfer to sites within component A.

An important consideration when modifying the crystal structure of hydrogen storage alloys through non-stoichiometry in accordance with the instant invention is the transfer of atoms from B-sites to A-sites. For example, the ratio of atoms in the B-site to the atoms in the A-site (B/A ratio) may be used to design a misch-metal based $AB_5$ hydrogen storage alloy, where A is selected from one or more rare earth elements, such as La, Ce, Pr, Nd, and B is selected from one or more of Ni, Co, Mn, Al, and other modifiers. By using an empirical function, the percentage of Ni switching from single occupancy B-sites to double occupancy A-sites within the hydrogen storage alloy crystal structure when larger atomic size Cu is added can be modeled. Preferably, at least 35 percent of Ni is transferred to A-sites from B-sites versus the total amount of Cu contained in the non-stoichiometric hydrogen storage alloy. More preferably, at least 45 percent of Ni is transferred to A-sites from B-sites versus the total amount of Cu contained in the non-stoichiometric hydrogen storage alloy. A pseudo-stoichiomtery can be calculated for more suitable alloy formulations to improve both the low temperature power application and cycle life in the NiMH battery. The B/A ratio is calculated in order to find the chemical composition most suitable for the low temperature power and cycle life performance of NiMH battery. B/A ratios of approximately 5.0 are preferred as non-storage phases may form with a B/A ratio lower than 5.0 and a Ni phases may appear with a B/A ratio higher than 5.0. In both situations, discharge capacity is lowered by adding non-storage phases into the alloy. Therefore, it is important to maintain a B/A ratio close to 5.0. Preferably, the B/A ratio is in the range of 4.80 to 5.20. More preferably, the B/A ratio is in the range of 4.90 to 5.10. Most preferably, the B/A ratio is in the range of 4.95 to 5.05.

When adding copper to the hydrogen storage alloy to create an non-stoichiometric $AB_5$ alloy, some of the nickel may be transferred to an A-site as dimers aligned along the c-axis of the alloy crystal structure. Since not all extra Ni atoms go to the A-site, an over-stoichiometric alloy (B/A>5.0) is formed by adding too many B-atoms having an atomic radius larger than Ni. Should too many Ni dumbbell-pairs form at the A-sites, the B/A ratio can fall below 5.0 and the cycle life will be deteriorated. As the amount of copper additive increases, the ratio of nickel occupying A-sites vs. the total copper amount must decrease. By analyzing an XRD of an over-stoichiometric $AB_5$ alloy as earlier described, the following empirical equation was constructed:

$$a = \frac{\text{Ni in A-site}}{\text{Entire Cu}} \% = 48.8 - 1724 * (q - 0.04)^2 \quad (1)$$

where a is ratio of copper to the non-rare earth element (Ni, Co, Mn, Al, Cu). FIG. 1 shows the empirical function used to develop empirical equation (1). Once the percentage of Ni in A-site vs. the copper additive amount was obtained, the Pseudo B/A ratio in alloy $AB_xCu_y$ is calculated by:

$$\text{Pseudo } B/A = \frac{x + (1-a)y}{1 + \frac{ay}{2}} \quad (2)$$

where a is the ratio of nickel occupying A-site vs. the whole copper additive and is given by equation (1). The Pseudo B/A ratio must be in the range of 4.80 to 5.20, more preferably in the range of 4.90 to 5.10, and most preferably in the range of 4.95 to 5.05 in order to take advantage of Cu-addition and still maintain good low temperature power performance. The atomic ratio of copper to the B-elements is calculated by:

$$q = \text{Cu in } B = \frac{\text{Cu content}}{\text{Cu content} + B \text{ element content}} \quad (3)$$

and listed in Table 1. Of the alloys listed in Table 1, alloy B is a conventional hydrogen storage alloy composition which is commercially available. Alloy B1 with copper additive is disclosed in U.S. Pat. No. 6,830,725 to Fetcenko et al. Alloys F3 and F4 are disclosed in the publication "On the Nature of the Electrochemical Cycling Stability of Non-stoichiometric $LaNi_5$-based hydride-forming compounds Part I. Crystallography and Electrochemistry," by Notten et al. published on Jan. 4, 1994. Alloys B31, B32, B36, and B37 are hydrogen storage alloys in accordance with the instant invention.

TABLE 1

| Alloy | Composition | Cu in B (atomic ratio) |
|---|---|---|
| B | $(La_{0.63}Ce_{0.26}Nd_{0.03}Pr_{0.08})_{1.0}(Ni_{0.72}Co_{0.15}Mn_{0.07}Al_{0.06})_{5.0}$ | 0.0 |
| B1 | $(La_{0.63}Ce_{0.26}Nd_{0.03}Pr_{0.08})_{1.0}(Ni_{0.81}Co_{0.06}Mn_{0.07}Al_{0.06})_{4.8}Cu_{0.2}$ | 0.04 |
| F3 | $LaNi_{4.4}Cu_{1.0}$ | 0.185 |
| F4 | $LaNi_{5.0}Cu_{1.0}$ | 0.167 |
| B31 | $(La_{0.63}Ce_{0.26}Nd_{0.03}Pr_{0.08})_{1.0}(Ni_{0.72}Co_{0.15}Mn_{0.07}Al_{0.06})_{4.3}Cu_{1.0}$ | 0.190 |
| B32 | $(La_{0.63}Ce_{0.26}Nd_{0.03}Pr_{0.08})_{1.0}(Ni_{0.72}Co_{0.15}Mn_{0.07}Al_{0.06})_{4.5}Cu_{1.0}$ | 0.180 |
| B36 | $(La_{0.63}Ce_{0.26}Nd_{0.03}Pr_{0.08})_{1.0}(Ni_{0.81}Co_{0.06}Mn_{0.07}Al_{0.06})_{5.13}Cu_{0.18}$ | 0.035 |
| B37 | $(La_{0.63}Ce_{0.26}Nd_{0.03}Pr_{0.08})_{1.0}(Ni_{0.81}Co_{0.06}Mn_{0.07}Al_{0.06})_{5.22}Cu_{0.30}$ | 0.054 |

The amount of Cu added to the alloy is used to calculate the percentage of Ni being transferred to the A-sites from the B-sites versus the total amount of copper included in the B-component as defined in equation (1) and also Pseudo B/A as defined in equation (2). Both values are listed in Table 2 for the alloys described above. Preferably, the percentage of Ni being transferred to the A-sites from the B-sites versus the total amount of copper included in the alloy is at least 48.0%, more preferably, at least 48.5%.

TABLE 2

| Alloy | Percent of Ni transferred to A-sites from B-sites vs. total amount of Cu | Pseudo B/A |
|---|---|---|
| B | N/A | 5.00 |
| B1 | 48.8 | 4.67 |
| F3 | 12.6 | 4.96 |
| F4 | 21.0 | 5.23 |
| B31 | 10.0 | 4.95 |
| B32 | 15.0 | 4.98 |
| B36 | 48.8 | 5.00 |
| B37 | 48.5 | 5.01 |

Another important factor to take into account when designing an $AB_5$ alloy is the ratio of X-ray lattice constant c to X-ray lattice constant a (c/a). The X-ray lattice constant ratio "c/a" of the partially substituted $AB_5$ alloy has been shown to affect PCT hysteresis. With substitutions like Zr, and Co, the c/a lattice constant ratio increases and the PCT hysteresis decreases, which generates less stress in the bulk of alloy during hydrogenation and thus maintain a good cycle life. Preferably, the c/a lattice constant is such that it provides a hysteresis less than or equal to 0.12. On the other hand, when Ni was partially replaced by Cu, B, and Y, the c/a lattice constant ratio decreases and the PCT hysteresis increases, which contributes a large stress in the alloy bulk and easy-pulverization during cycling. Therefore a larger c/a lattice constant ratio is always more preferable. Preferably, the c/a lattice constant ratio is greater than or equal to 0.805. More preferably, the c/a lattice constant ratio is greater than or equal to 0.809.

The instant hydrogen storage alloys may be prepared by a variety of methods that include melt casting, induction melting, rapid solidification, mechanical alloying, sputtering and gas atomization. Representative preparations are provided for below. An important aspect of the preparation process of many hydrogen storage alloys is a post-formation annealing step in which the material as formed during preparation is subjected to an annealing treatment. The annealing treatment includes heating the material to an elevated temperature for a sufficient period of time. An effect of annealing is to alter or condition the surface of the hydrogen storage material in such a way that the material is susceptible to or responsive to the accelerated and directed preferential corrosion process described hereinabove that leads to formation of angstrom scale catalytic metal or metal alloy particles and greater void volume fraction in the surface region. The extent to which accelerated and directed preferential corrosion forms angstrom scale catalytic particles during activation is influenced by the local composition at or near the surface. In the materials of the '591 and '719 patents incorporated by reference hereinabove, local nickel enrichment in the surface region was observed to enable or facilitate formation of angstrom scale catalytic nickel or nickel alloy particles upon activation. A suitable annealing step induces a condition in the surface region in which the nickel concentration is enriched relative to the statistical concentration expected from the formula unit of the hydrogen storage alloy. Annealing under appropriate conditions initiates a segregation of nickel away from the bulk and toward the surface region to provide a nickel enriched surface region.

While not wishing to be bound by theory, the instant inventors believe that formation of a surface region having a sufficiently high nickel concentration enables formation of angstrom scale catalytic nickel or nickel alloy particles upon activation. In addition to a high nickel concentration, a nickel enriched surface region may also include microstructural features that facilitate formation of angstrom scale catalytic nickel or nickel alloy particles. The annealing induced segregation, for example, may be accompanied by local changes in phase, structure, crystallinity, grains, interfaces, etc. in the surface region that may be conducive to formation of angstrom scale catalytic nickel or nickel alloy particles during activation. In connection with the materials of the '591 patent, the instant inventors have demonstrated that angstrom scale catalytic nickel or nickel alloy particles do not form upon activation of materials that have not been subjected to an annealing step. Instead of unoxidized metallic nickel or nickel alloy particles, the surface region of unannealed materials comprises oxidized nickel in the form of an $Ni^{n+}$-rich oxide phase.

The segregation effect observed upon annealing the materials of the '591 patent is believed to be enhanced under the influence of microstructure tuning according to the instant invention. Inclusion of a microstructure tuning element, for example, may lead to greater segregation of nickel and a greater local enrichment of nickel concentration in the instant hydrogen storage alloys relative to the hydrogen storage alloys of the '591 or '719 patents. A local enrichment of other metals such as Co or a microstructure tuning element itself may also occur. As a result, the preferential corrosion that occurs upon activation is more pronounced in the instant alloys and leads to the effects of increased support matrix porosity, greater void volume fraction, increased density of catalytic metallic nickel or nickel alloy particles and/or increased self supporting behavior within the interface region described hereinabove in connection with the accelerated and directed preferential corrosion effect provided according to the microstructure tuning of the instant invention. Microstructure tuning according to the instant invention may facilitate formation of catalytic metallic particles and increase the volume of voids in the interface region. According to a model described hereinabove, the instant microstructure tuning may increase the kinetic rate of formation of catalytic metallic particles and inhibit collapse of any remaining, undepleted support material into the void.

The formula modifiers used in some embodiments of the instant invention have appeared in some prior art alloys, but have not been utilized to effect the beneficial microstructural phenomena associated with the instant alloys. In U.S. Pat. No. 5,738,953 to Lichtenberg et al., for example, alloys having the formula $MmNi_vAl_wMn_xCo_yM_z$ are disclosed where Mm is mischmetal and M is Cu, Fe or a mixture of Cu and Fe. Alloys prepared by melt casting and gas atomization are disclosed. Since the preparation of the Lichtenberg melt cast alloys did not include an annealing step, catalytic metallic particles (such as those described in the '591 patent) are not expected to form. As a result, the accelerated and directed preferential corrosion facilitated by the presence of Cu or Fe during activation according to the instant invention would not occur in the melt cast alloys of Lichtenberg et al. and the Lichtenberg alloys would not exhibit the beneficial high porosity microstructure of the instant alloys. In fact, Lichtenberg indicated that these alloys had significantly reduced cycle life and specifically disclosed gas atomization as a necessary means to recover cycle life. The gas atomized alloys of Lichtenberg included a heat treatment step, but the effect of the heat treatment was to increase the storage capacity of the as-formed gas atomized alloys by decomposing and diffusing the boundary regions between the gas atomized particles. This heat treatment has the effect of decreasing the surface area of the gas-atomized particles and lowering the overall porosity through a fusion of smaller particles into larger particles. The Lichtenberg alloys also show a noticeable decrease in initial capacity and in capacity after repeated cycling relative to the cobalt containing reference alloy discussed in their patent. The inclusion of Cu and/or Fe in the Lichtenberg alloys thus lead to a decrease in battery capacity relative to prior art compositions. The Lichtenberg patent further fails to teach improved low temperature power or capacity.

In U.S. Pat. No. 6,329,100 to Imoto et al., alloys having the formula $MmNi_aCO_bAl_cM_d$ are disclosed where Mm is mischmetal and M is Mn and/or Cu. The alloys specifically include a combination of two different compositions. The alloys were prepared by melt casting, but were not subject to an annealing step and the included Cu would not beneficially alter the microstructure during activation as in the instant alloys. The alloys of Imoto et al. are further reported to have improved discharge rates at 0° C., but this improvement is due to a Teflon coating treatment, hydrogen reduction treatment or acid treatment. Further, the disclosed 0° C. performance, while improved, is less spectacular than the low temperature improvements associated with the instant alloys. The Teflon coating treatment is believed to protect the hydrogen storage alloy from the electrolyte during operation and improves the hydrogen absorption efficiency, especially during overcharging. The hydrogen reduction and acid treatments are believed to enhance the concentration of non-mischmetal components near the surface so that wettability with the electrolyte is enhanced. No teaching of modifications to the porosity of support matrix, nature or distribution of catalytic particles, or other microstructural phenomena is presented in the patent of Imoto et al. The alloys of Imoto et al. do not benefit from the accelerated and directed preferential corrosion of the instant invention.

In U.S. Pat. No. 6,106,768 to Lee et al., several $AB_5$ alloys are disclosed where A is mischmetal and B includes one or more of Ni, Co, Mn, and Al along with a modifier selected from the group consisting of Cr, Cu, Zn, Fe, or Si. The alloys of Lee et al. were prepared by arc-melting under Ar and were not subject to an annealing step. The modifiers were included as substitutes for Co in an attempt to lower alloy cost and improve hydrogen storage capacity. The modifiers were selected for their stronger affinity for hydrogen and their greater oxidation resistance relative to Co. According to Lee et al., the modifiers improve cycle life by promoting the formation of a highly dense oxide layer that leads to reduced degradation upon repeated cycling. The invention of Lee et al. thus teaches away from the more porous oxide support provided by the microstructure tuning elements of the instant invention.

In U.S. Pat. No. 6,331,367 to Ebihara et al., hydrogen storage alloys having a porous surface layer are described where the pore diameter is between 1-2 nm and the pore volume fraction is less than 1%. The preparation of the alloys of Ebihara et al. included separate alkaline and acid etching steps to form a nickel-condensed layer and a surface layer with the stated pore diameter. As described more fully hereinbelow, the pore sizes and pore volume fractions of the Ebihara et al. alloys are significantly smaller than those of the instant alloys. The larger void sizes and larger void volume fractions of the instant alloys facilitate the superior low temperature power and discharge characteristics of the instant alloys.

The instant alloys may be used as thermal or electrochemical hydrogen storage materials in devices such as fuel cells or batteries. Battery types include flat cells, wound cells, cylindrical cells, prismatic cells, sealed cells, vented cells etc. Batteries formed from the instant hydrogen storage materials provide higher powers than currently available batteries at room temperature and especially at temperatures below room temperature such as 0° C. or −30° C. Batteries formed from the instant hydrogen storage materials are rechargeable and may be used in HEV or EV applications and as starter batteries in conventional vehicles such as automobiles, buses, tractors, etc.

Further insight into the scope of the instant invention are provided in the illustrative examples presented hereinbelow. The following examples are intended to be representative of, rather than comprehensively defining of, the instant invention.

EXAMPLE 1

Industry grade raw materials were mixed in accordance with the target compositions listed in Table 1 and melted in an induction furnace under argon atmosphere. After the materials were melted, the melt was maintained at the same temperature for 20 minutes to achieve better homogeneity. The melt was then poured into a carbon steel cylindrical mold and cooled. After cooling, the samples were annealed in a tube furnace at 960° C. for 8 hours to further homogenize the composition. Small pieces of the cooled ingots were taken for the x-ray diffraction analysis (XRD), composition analysis by induction coupled plasma (ICP) method and gas phase pressure-concentration-isotherm study (PCT). The ICP analysis confirmed the final composition of the alloys as previously listed in Table 1.

Figure 2:
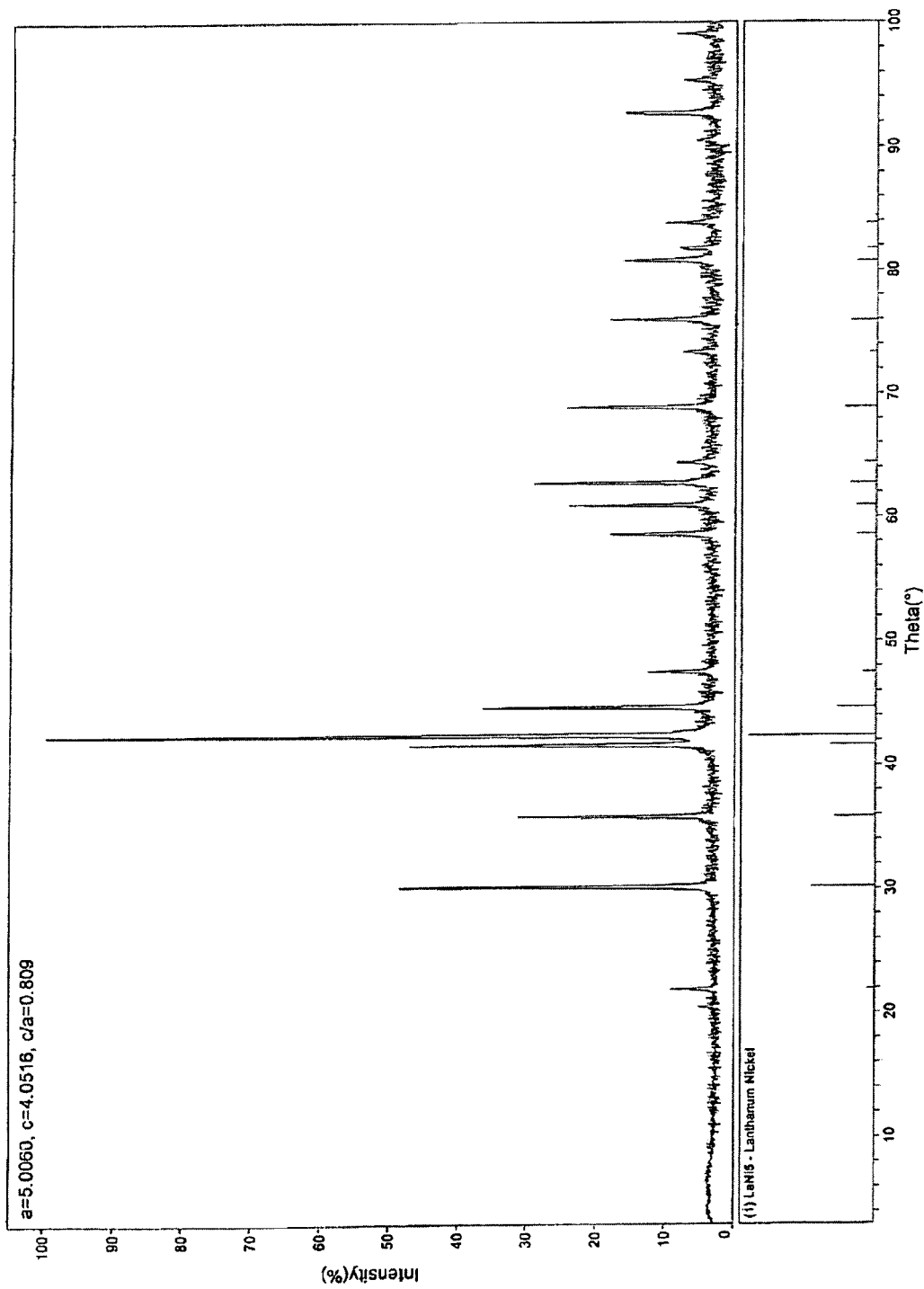
FIG. 2, shows a XRD spectrum taken with Cu—$K_2$ radiation of the B36 alloy in accordance with the instant invention.

All eight samples showed mainly $CaCu_5$ crystal structure with various lattice constants and results were summarized in Table 3. An XRD spectrum from B36 alloy can be found in FIG. 2. From the cycle life point of view, a larger c/a ratio is more desirable. As indicated in Table 3, all the alloy samples in accordance with the instant invention have c/a ratios higher than 0.806, while the samples from prior art show a smaller c/a ratio.

TABLE 3

| Alloy | a-lattice const. (Å) | c-lattice const. (Å) | c/a ratio |
| --- | --- | --- | --- |
| B   | 5.03  | 4.04  | 0.803 |
| B1  | 5.023 | 4.051 | 0.806 |
| F3  | 5.011 | 4.019 | 0.802 |
| F4  | 4.998 | 4.025 | 0.805 |
| B31 | 5.027 | 4.061 | 0.808 |
| B32 | 5.027 | 4.058 | 0.807 |
| B36 | 5.006 | 4.052 | 0.809 |
| B37 | 5.007 | 4.049 | 0.810 |

A PCT isotherm for each alloy was measured at 30° C. and the hysteresis was calculated from $\ln(P_a/P_d)$, where $P_a$, $P_d$ are the hydrogen absorption, desorption equilibrium pressure at a hydrogen concentration of 0.5 wt. %, respectively. The PCT hysteresis for each alloy is listed below in Table 4. As shown in Table 4, B starts with a PCT hysteresis of 0.10 and does not have cycle problems. As copper was added to alloy B to form the B1 alloy, the PCT hysteresis went up to 0.25 and caused a large strain to build up between the near surface and bulk region, thereby deteriorating the cycle life. Alloys F3 and F4 alloys did not demonstrate an improved hysteresis (0.26 and 0.52, respectively). Alloys B31 (0.09), B32 (0.10), B36 (0.11), and B37 (0.12) all showed consistent improvement in PCT hysteresis, which reduces the pulverization during hydride/dehydride process thereby enhancing cycle life performance.

TABLE 4

| Alloy | Plateau Pressure | Max. Storage | Hysteresis |
| --- | --- | --- | --- |
| B   | 100 torr  | 1.35 wt. % | 0.10 |
| B1  | 100 torr  | 1.30 wt. % | 0.25 |
| F3  | 3000 torr | 1.15 wt. % | 0.26 |
| F4  | 4000 torr | 0.90 wt. % | 0.52 |
| B31 | 500 torr  | 1.2 wt. %  | 0.09 |
| B32 | 450 torr  | 1.1 wt. %  | 0.10 |
| B36 | 380 torr  | 1.35 wt. % | 0.11 |
| B37 | 370 torr  | 1.35 wt. % | 0.12 |

Figure 3:
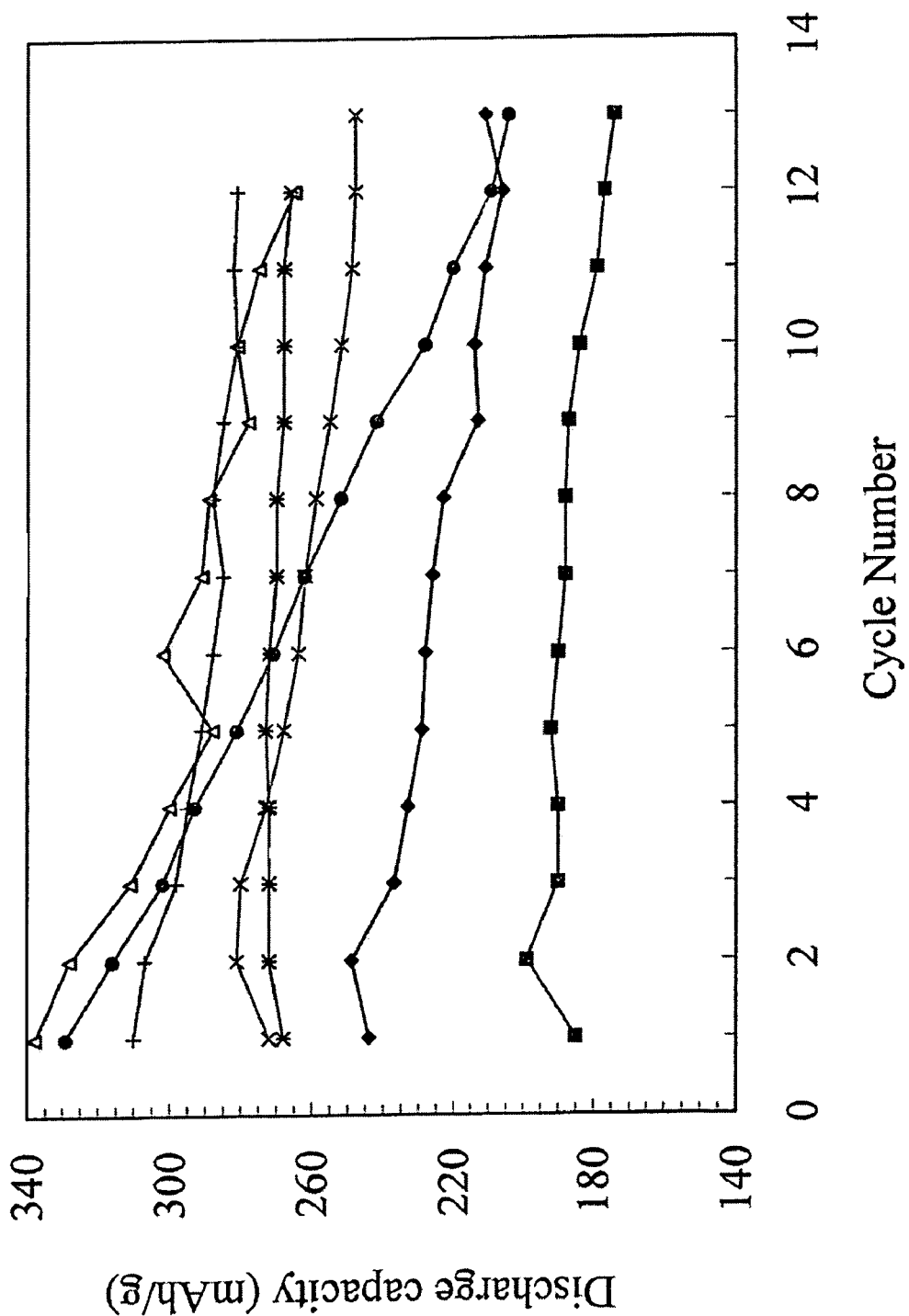
FIG. 3, shows small electrode half cell results for the alloys of the instant invention.
Figure 4:
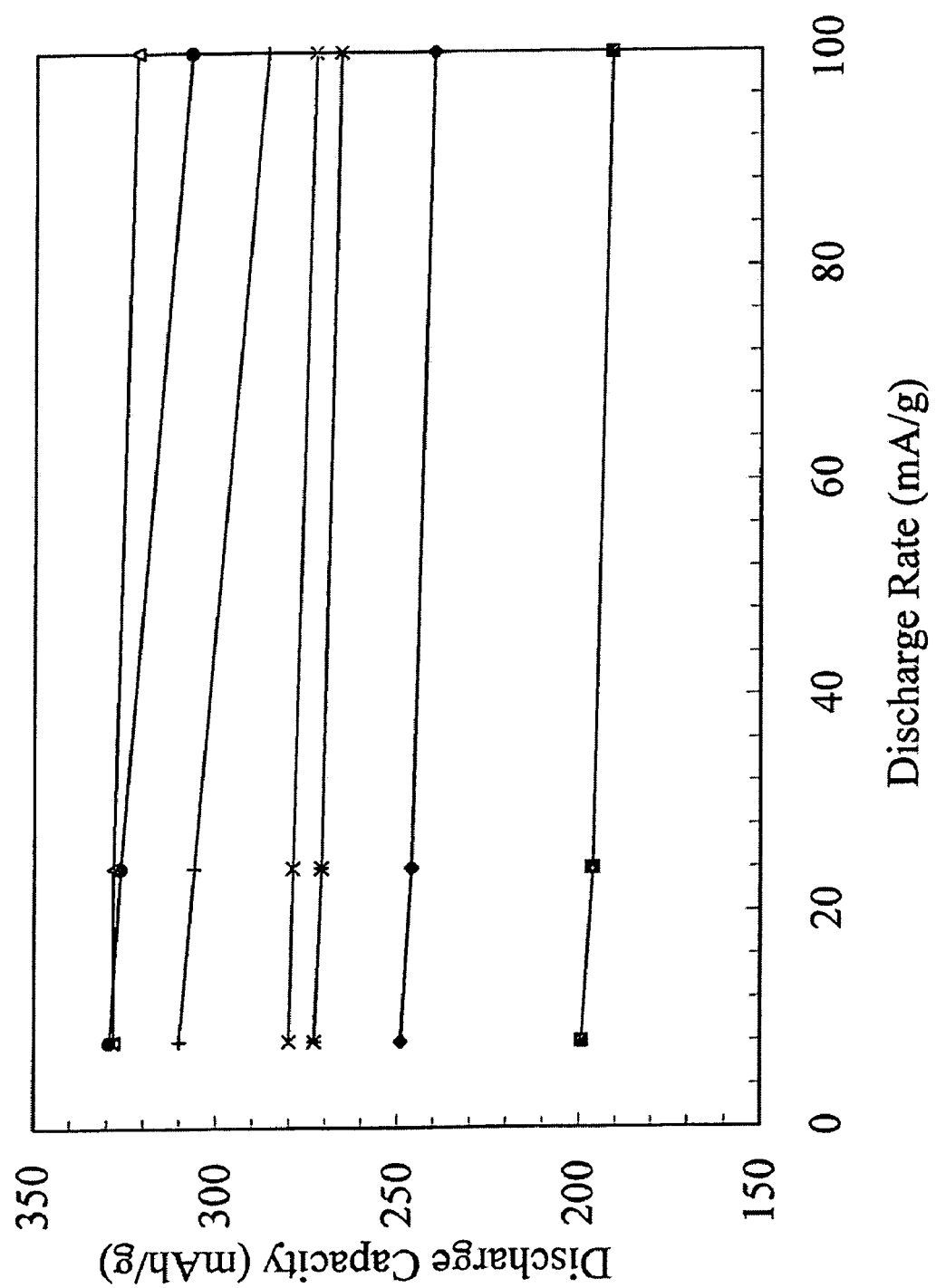
FIG. 4, shows small electrode half cell discharge capacities at different discharge rates for the alloys of the instant invention.

The alloy samples were crushed into powder of 200 mesh or smaller and was pressed onto a Ni-mesh substrate without other conducting metal powder or inorganic additives. The electrochemical capacity of the alloy was determined by constructing a flooded full cell using grafted PE/PP separators, partially pre-charged $Ni(OH)_2$ counter electrodes, and a 30% KOH aqueous solution as electrolyte. The cells were charged at 40 mA/g rate for 10 hours and then discharged to 0.8 cell voltage with 100 mA/g plus two pulls at 24 and 8 mA/g. The full discharge capacity for the first 10 cycles are plotted in FIG. 3 (Δ—B1, ♦—F3, ■—F4, ×—B31, *—B32, ●—B36, +—B37) and summarized below in Table 5. Alloys F3 and F4 showed poor capacity while alloys B36 and B37 showed a capacity similar to base alloy B. The power dependence of all alloys are plotted in FIG. 4 (Δ—B1, ♦—F3, ■—F4, ×—B31, *—B32, ●—B36, +—B37) and show similar slope within the discharge current range.

TABLE 5

| Alloy | Initial Capacity(mAh/g), C1 | C10/C1 (%) |
| --- | --- | --- |
| B   | 325 | 86  |
| B1  | 338 | 83  |
| F3  | 244 | 88  |
| F4  | 185 | 99  |
| B31 | 272 | 93  |
| B32 | 268 | 100 |

TABLE 5-continued

| Alloy | Initial Capacity(mAh/g), C1 | C10/C1 (%) |
|---|---|---|
| B36 | 329 | 69 |
| B37 | 310 | 91 |

Figure 5:
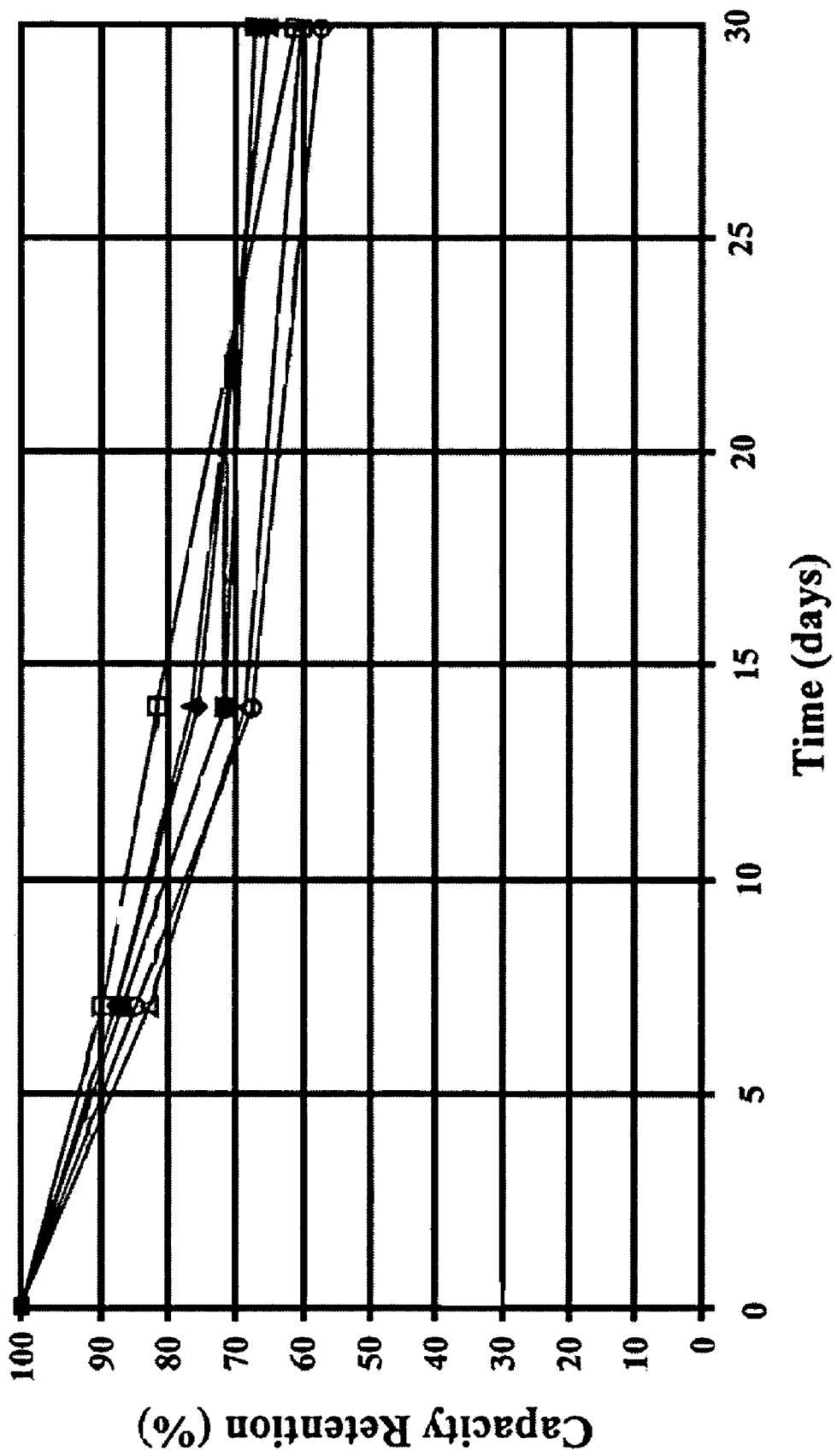
FIG. 5, shows 7, 14 and 30 days charge retention data for sealed electrochemical cells utilizing negative electrodes incorporating alloys of the instant invention.

Alloys B, B1, B31, B32, B36, and B37 were made into negative electrodes by applying the alloy via a dry compaction method on nickel expanded substrate. The negative electrode, nickel hydroxide positive electrode and PE/PP grafted non-woven separator were rolled together and inserted into a stainless steel container to form a size-C sealed cell. The peak power for the electrodes was measured by a 10 second 10 C rate discharge pulse method. The cycle life testing was performed using a −3 mV ΔV method and C/2 charge and discharge current. The end of cycle life was defined as reaching 50% of initial capacity. The data for peak power and cycle life are listed below in Table 6. The results show that the base alloy B does not deliver any power at −30° C., but the B alloy shows good cycle life. As Cu was added into the B component to form the B1 alloy, both peak powers at room temperature and low temperature increased, but the cycle life decreased by half. Although alloys B31 and B32 (higher copper content), showed a good cycle life, the low temperature power of the alloys was as poor as base alloy B. Only the B36 and B37 alloys demonstrated a combination of low temperature power and cycle life performance. The charge retention data from all cells are plotted in FIG. 5 (○—B, Δ—B1, ♦—B31, ■—B32, □—B36, and ▲—B37) and show similar degradation with time.

TABLE 6

| Alloy | Peak Power at 35° C. ( ) | Peak Power at −30° C. ( ) | Cycle life |
|---|---|---|---|
| B | 651 | 0 | 900 |
| B1 | 991 | 198 | 500 |
| B31 | 796 | 0 | 900 |
| B32 | 800 | 0 | 1200 |
| B36 | 703 | 125 | 800 |
| B37 | 771 | 185 | 800 |

EXAMPLE 2

In this example, the preparation and formulas of several metal hydride materials according to the instant invention are described. The instant metal hydride materials exhibit low hysteresis effects and excellent low temperature characteristics as will be described in other examples hereinbelow. The alloys further include a lower concentration of Co than is typically used in commercial metal hydrides. The alloys of this example are $AB_5$ type alloys. Each alloy was prepared by combining mischmetal and the remaining components in elemental form (purity of each element>99%) in the required stoichiometric ratio in an MgO crucible. The mischmetal used in this example included La, Ce, Pr, and Nd in a molar ratio of La:Ce:Pr:Nd=10.5:4.3:0.5:1.4 (Type B alloys) and 5.2:8.1:0.9:2.5 (Type C alloys). The total mass of the combined starting elements was approximately 2 kg. The crucible was subsequently placed into a water-cooled induction furnace under a 1 atm. argon atmosphere, heated to about 1350° C. and held at that temperature for 15-20 minutes. During heating, the material in the crucible melted and became superheated to provide better homogeneity. After this heating step, the material was cooled down to just slightly above its melting point (ca. 1280° C.) and immediately poured into a steel mold through a tundish. After pouring, the material was cooled to room temperature. The resulting ingot was then annealed at a temperature between 950° C. and 1050° C. for a time period ranging from 5-12 hours in a vacuum chamber pumped by a diffusion pump. After annealing, the ingot was returned to room temperature. The cooled ingot was then mechanically pulverized and sieved through a 200 mesh filter. Rare earths may also be combined in the form of individual elements.

Table 7 shows selected alloys from the prior art that will serve as a basis for comparison to illustrate the benefits of the instant alloys in the examples described hereinbelow. Representative $AB_5$ alloys in accordance with the instant invention and prepared using the above method are presented in Tables 8 and 9. In these alloys, component A is the mischmetal described above and component B is a combination of transition metals, as shown in Tables 8 and 9. The compositions shown in Tables 8 and 9 are in at. % and also correspond to molar proportions. Entries of 0 indicate that the element was not intentionally included in the preparation of the alloy.

In Table 8 (B-type alloys), the alloys B18, B19, B20, B21, B22, B23, B24, B27, and B28 include the microstructure modifying element Cu described in the '725 patent and further include a cycle life enhancement element according to the instant invention. The alloys B18, B19, B20, B21, B22, B23 and B24 include Zr as a cycle life enhancement element, alloys B25 and B26 include Si as a cycle life enhancement element and alloys B27 and B28 include Zr and Si as cycle life enhancement elements.

In Table 9 (C-type alloys), the alloys C1 and C4 include the microstructure modifying element Cu described in the '725 patent. The alloys C18, C19, C20, C21, C22, C23, C24, C27, and C28 include the microstructure modifying element Cu described in the '725 patent and further include a cycle life enhancement element according to the instant invention. The alloys C18, C19, C20, C21, C22, C23, and C24 include Zr as a cycle life enhancement element, while the alloys C27 and C28 include Si as a cycle life enhancement element. The alloys C25 and C26 do not include Cu, but do include Si as a cycle life enhancement element.

TABLE 7

| Alloy | La | Ce | Pr | Nd | Ni | Co | Mn | Al | Cu |
|---|---|---|---|---|---|---|---|---|---|
| B | 10.5 | 4.3 | 0.5 | 1.4 | 60.0 | 12.7 | 5.9 | 4.7 | 0.0 |
| B0 | 10.5 | 4.3 | 0.5 | 1.4 | 64.5 | 8.4 | 4.6 | 6.0 | 0.0 |
| B1 | 10.5 | 4.3 | 0.5 | 1.4 | 64.5 | 5.0 | 4.6 | 6.0 | 3.4 |
| B4 | 10.5 | 4.3 | 0.5 | 1.4 | 65.9 | 5.0 | 4.6 | 6.0 | 2.0 |
| B12 | 10.5 | 4.3 | 0.5 | 1.4 | 64.5 | 3.0 | 4.6 | 6.0 | 5.4 |

TABLE 8

| Alloy | La | Ce | Pr | Nd | Ni | Co | Mn | Al | Cu | Zr | Si |
|---|---|---|---|---|---|---|---|---|---|---|---|
| B18 | 10.5 | 4.3 | 0.5 | 1.4 | 64.5 | 5.0 | 4.6 | 6.0 | 1.7 | 1.7 | 0.0 |
| B19 | 10.5 | 4.3 | 0.5 | 1.4 | 64.5 | 5.0 | 4.6 | 6.0 | 2.3 | 1.1 | 0.0 |
| B20 | 10.5 | 4.3 | 0.5 | 1.4 | 62.8 | 5.0 | 4.6 | 6.0 | 3.4 | 1.7 | 0.0 |
| B21 | 10.5 | 4.3 | 0.5 | 1.4 | 64.0 | 5.0 | 4.6 | 6.0 | 3.4 | 0.5 | 0.0 |
| B22 | 10.5 | 4.3 | 0.5 | 1.4 | 64.3 | 5.0 | 4.6 | 6.0 | 3.4 | 0.2 | 0.0 |
| B23 | 10.5 | 4.3 | 0.5 | 1.4 | 64.5 | 5.0 | 4.6 | 6.0 | 2.9 | 0.5 | 0.0 |
| B24 | 10.5 | 4.3 | 0.5 | 1.4 | 64.5 | 5.0 | 4.6 | 6.0 | 3.2 | 0.2 | 0.0 |
| B25 | 10.5 | 4.3 | 0.5 | 1.4 | 64.38 | 8.28 | 4.48 | 5.88 | 0.0 | 0.0 | 0.5 |
| B26 | 10.5 | 4.3 | 0.5 | 1.4 | 64.25 | 8.15 | 4.35 | 5.75 | 0.0 | 0.0 | 1.0 |
| B27 | 10.5 | 4.3 | 0.5 | 1.4 | 64.4 | 4.9 | 4.5 | 5.9 | 3.3 | 0.0 | 0.5 |

TABLE 8-continued

| Alloy | La | Ce | Pr | Nd | Ni | Co | Mn | Al | Cu | Zr | Si |
|---|---|---|---|---|---|---|---|---|---|---|---|
| B28 | 10.5 | 4.3 | 0.5 | 1.4 | 64.3 | 4.8 | 4.4 | 5.8 | 3.2 | 0.0 | 1.0 |
| B35 | 10.5 | 4.3 | 0.5 | 1.4 | 64.5 | 8.4 | 4.6 | 6.0 | 0.0 | 0.0 | 0.0 |

TABLE 9

| Alloy | La | Ce | Pr | Nd | Ni | Co | Mn | Al | Cu | Zr | Si |
|---|---|---|---|---|---|---|---|---|---|---|---|
| C | 5.2 | 8.1 | 0.9 | 2.5 | 59.1 | 13.0 | 5.9 | 5.3 | 0.0 | 0.0 | 0.0 |
| C0 | 4.4 | 8.7 | 0.9 | 2.6 | 64.5 | 8.4 | 4.6 | 6.0 | 0.0 | 0.0 | 0.0 |
| C1 | 4.4 | 8.7 | 0.9 | 2.6 | 64.5 | 5.0 | 4.6 | 6.0 | 3.4 | 0.0 | 0.0 |
| C4 | 4.4 | 8.7 | 0.9 | 2.6 | 65.9 | 5.0 | 4.6 | 6.0 | 2.0 | 0.0 | 0.0 |
| C18 | 4.4 | 8.7 | 0.9 | 2.6 | 64.5 | 5.0 | 4.6 | 6.0 | 1.7 | 1.7 | 0.0 |
| C19 | 4.4 | 8.7 | 0.9 | 2.6 | 64.5 | 5.0 | 4.6 | 6.0 | 2.3 | 1.1 | 0.0 |
| C20 | 4.4 | 8.7 | 0.9 | 2.6 | 62.8 | 5.0 | 4.6 | 6.0 | 3.4 | 1.7 | 0.0 |
| C21 | 4.4 | 8.7 | 0.9 | 2.6 | 64.0 | 5.0 | 4.6 | 6.0 | 3.4 | 0.5 | 0.0 |
| C22 | 4.4 | 8.7 | 0.9 | 2.6 | 64.3 | 5.0 | 4.6 | 6.0 | 3.4 | 0.2 | 0.0 |
| C23 | 4.4 | 8.7 | 0.9 | 2.6 | 64.5 | 5.0 | 4.6 | 6.0 | 2.9 | 0.5 | 0.0 |
| C24 | 4.4 | 8.7 | 0.9 | 2.6 | 64.5 | 5.0 | 4.6 | 6.0 | 3.2 | 0.2 | 0.0 |
| C25 | 4.4 | 8.7 | 0.9 | 2.6 | 64.38 | 8.28 | 4.48 | 5.88 | 0.0 | 0.0 | 0.5 |
| C26 | 4.4 | 8.7 | 0.9 | 2.6 | 64.25 | 8.15 | 4.35 | 5.75 | 0.0 | 0.0 | 1.0 |
| C27 | 4.4 | 8.7 | 0.9 | 2.6 | 64.4 | 4.9 | 4.5 | 5.9 | 3.3 | 0.0 | 0.5 |
| C28 | 4.4 | 8.7 | 0.9 | 2.6 | 64.3 | 4.8 | 4.4 | 5.8 | 3.2 | 0.0 | 1.0 |

EXAMPLE 3

In this example, a measure of hysteresis is described that will be used in the evaluation and analysis of the PCT characteristics of the instant alloys in several examples presented hereinbelow. One measure of hysteresis is a determination of the ratio of the pressure along the absorption isotherm ($P_a$) to the pressure along the desorption isotherm ($P_d$) at a particular absorbed hydrogen concentration in the plateau region. While this measure of hysteresis is widely used in the art and provides guidance as to differences between the absorption and desorption isotherms, it is believed by the instant inventors to be an incomplete indicator of the physical mechanisms underlying hysteresis. Hysteresis is a reflection of the activation barriers associated with the introduction and mobility of hydrogen in a metal hydride or other hydrogen storage material. Materials exhibiting large hysteresis are characterized by large activation barriers and vice versa. Thus, in order to best describe hysteresis, it is desirable to identify a property of the PCT curves that correlates with the activation barrier.

FIG. 6 presents a measure of hysteresis that the instant inventors believe to be a more effective measure than the logarithmic measure ($\ln(P_a/P_d)$) commonly used in the prior art. FIG. 6 presents two schematic PCT plots, each of which shows an absorption isotherm (upper curve) and desorption isotherm (lower curve). The PCT plots present the dependence of the hydrogen pressure as a function of absorbed hydrogen concentration for the absorption and desorption isotherms. Each plot further includes an intermediate dashed curve located between the absorption and desorption isotherms and introduces the maximum concentration difference (abbreviated MCD) as a measure of hysteresis. As shown in FIG. 6, the maximum concentration difference is a measure of the horizontal displacement of the absorption isotherm relative to the dashed curve. The appropriateness of maximum concentration difference as a measure of hysteresis stems from the physical significance of the dashed curve. Specifically, the dashed curve corresponds to a hypothetical or theoretical situation in which no activation barrier to the introduction and mobility of absorbed hydrogen in the metal hydride material is present. The maximum concentration difference is thus a measure of the difference between the concentration of hydrogen that would be absorbed in the metal hydride in the absence of an activation barrier and the actual amount of hydrogen absorbed at a particular pressure. The larger the maximum concentration is, the larger is the activation barrier and the greater is the driving force needed to drive hydrogen into the material.

Placement of the dashed curve can be achieved rigorously through a theoretical analysis that accounts for the activation barriers associated the incorporation and extraction of hydrogen from the metal hydride material. Oftentimes, however, the parameters needed for such an analysis are unknown or difficult to obtain and it is more convenient operationally to approximate a rigorous theoretical version of the dashed curve with a close approximation thereof. In the instant invention, the dashed curve used in the determination of the maximum concentration difference is obtained as the locus of vertical midpoints between the absorption and desorption isotherms of a metal hydride material. Thus, the dashed curves shown in panels (a) and (b) of FIG. 6 are obtained for each abscissa point by taking the average of the pressures along the absorption and desorption isotherms for that point. The set of all such points forms the dashed curve used in determining maximum concentration difference in the instant invention. The horizontal difference between the absorption isotherm and the dashed curve is referred to herein as a concentration difference and is generally reported in terms of weight percent (wt. %) absorbed hydrogen. As is evident from the appearance of the PCT plot, several horizontal concentration differences may be determined for a metal hydride material. Of the different possible horizontal concentration differences that may be determined for a metal hydride material based on its PCT curve, the one having the maximum value is referred to herein as the maximum concentration difference and is used herein as a measure of the hysteresis of a metal hydride material. The maximum concentration difference is thus the greatest horizontal separation between the absorption isotherm and the dashed curve and is believed by the instant inventors to be the most effective measure of hysteresis, pulverization, lattice stresses upon hydriding etc. of metal hydride materials.

Consider, by way of example, panel (a) of FIG. 6. This panel shows that the maximum concentration difference occurs at the indicated pressure $P_a$. The maximum concentration difference is depicted as a horizontal segment at $P_a$ that extends from the absorption isotherm to the dashed line. When superimposed on the horizontal axis, the length of this segment provides a numerical value for the maximum concentration difference. The horizontal segment is defined by a right endpoint that corresponds to the concentration of hydrogen that would be absorbed at a pressure $P_a$ if the metal hydride material possessed no barrier to the incorporation of hydrogen and a left endpoint that corresponds to the actual concentration of hydrogen absorbed at $P_a$. A large difference between these two absorbed hydrogen concentrations signifies a large activation barrier and indicates that a large driving force is needed to incorporate hydrogen within the metal hydride material. Panel (a) of FIG. 6 is an example of a material having a large maximum concentration difference. Panel (b) of FIG. 6, in contrast, is an example of a material having a small maximum concentration difference. Panel (b) of FIG. 6 shows the maximum concentration difference at $P_a$ and it is evident that the maximum concentration difference of panel (b) of FIG. 6 is much smaller than the maximum concentration difference of panel (a) of FIG. 6. A small maximum concentration difference indicates that the activation barrier to the incorporation of hydrogen into the metal hydride material is small and that the driving force required to incorporate hydrogen is small. This follows from the similarity of the theoretically and actually absorbed concentrations of hydrogen in a material having a small maximum concentration difference. In the limiting case of a vanishing maximum concentration difference, theoretical (dashed) isotherm and the actual (experimental) absorption isotherm would coincide. (The absorption and desorption isotherms would also coincide in this limiting case.)

In terms of hysteresis, a material having a large maximum concentration difference shows a large hysteresis effect and is accordingly expected to exhibit poor cycle life characteristics and significant pulverization upon repeated cycling. Similarly, a material having a small maximum concentration difference shows a small hysteresis effect and is accordingly expected to exhibit good cycle life characteristics and more gradual pulverization upon repeated cycling. Materials having a large maximum concentration difference are expected to exhibit larger gradients in the concentration of absorbed hydrogen than materials having a small maximum concentration difference. The internal stresses that develop in materials having a large maximum concentration difference are accordingly larger than those that develop in materials having a small maximum concentration difference, with the result that materials having a large maximum concentration difference are more susceptible to pulverization and particle size degradation upon repeated cycling.

Since the maximum concentration difference is based on the underlying energy barriers and driving forces associated with the incorporation of absorbed hydrogen and is a manifestation of the concentration gradients of absorbed hydrogen that lead to internal stresses and pulverization, the instant inventors believe that it is a better measure of hysteresis than the conventional logarithmic ($\ln(P_a/P_d)$) measure of hysteresis. FIG. 6 provides an example of how maximum concentration difference is distinct from $\ln(P_a/P_d)$ as a measure of hysteresis. Panels (a) and (b) of FIG. 6 are PCT plots of large and small hysteresis materials, respectively, when viewed in terms of maximum concentration difference as a measure of hysteresis. If viewed in terms of $\ln(P_a/P_d)$ as measure of hysteresis, however, the two materials would be deemed to have the same degree of hysteresis because the vertical displacement between the absorption and desorption isotherms is the same for the materials depicted in panels (a) and (b). FIG. 6 thus shows that the underlying activation barriers, concentration gradients etc. of two materials having the same traditional logarithmic measure of hysteresis can be quite different. The maximum concentration difference measure of hysteresis accounts for such differences and provides a more complete indicator of the cycling characteristics of a metal hydride material.

The traditional logarithmic measure of hysteresis may provide a reliable comparison of the cycle life properties of different metal hydride alloys when the slopes of the absorption and desorption isotherms of the different metal hydride alloys are similar. This conclusion follows because similarity in slopes in a comparison of different materials means that a vertical displacement measure of hysteresis is a reasonable substitute for a measure of hysteresis based on horizontal displacement. When the materials being compared, however, have absorption and desorption isotherms that differ appreciably in slope, maximum concentration difference becomes a better measure of hysteresis. As shown in FIG. 6, for example, materials having a large maximum concentration difference generally have PCT plateaus that are flat or weakly sloping (panel (a)), while materials having a small maximum concentration difference generally have PCT plateaus that are more strongly sloped (panel (b)).

EXAMPLE 4

In this example, the PCT and hysteresis characteristics of several of the instant alloys are described. PCT curves are measured upon absorption and desorption of hydrogen at 30° C. and hysteresis is determined through a comparison of the absorption and desorption isotherms. Hysteresis is assessed primarily in terms of the maximum concentration difference described hereinabove. The conventional logarithmic ($\ln(P_a/P_d)$) measure of hysteresis may also be referred to. The alloys considered in this example include Zr as a cycle life enhancement element.

Figure 7:
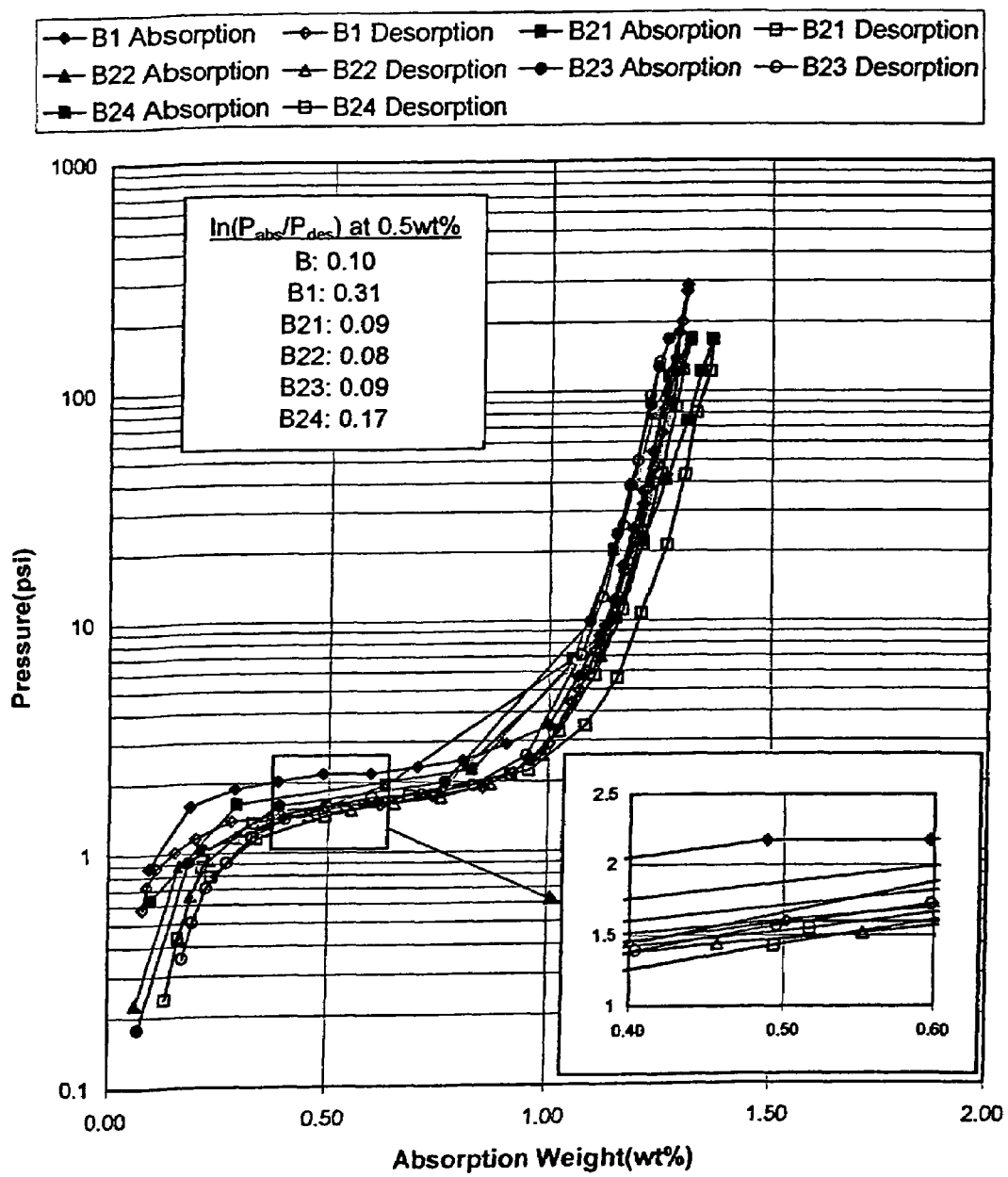
FIG. 7, shows a PCT plot of the B1, B21, B22, B23 and B24 alloys at 30° C.

FIG. 7 shows the PCT curves of the instant B21, B22, B23, and B24 alloys at 30° C. The curves show the dependence of hydrogen pressure (plotted on a logarithmic scale) on the weight percent of absorbed hydrogen. Absorption and desorption isotherms are shown for each alloy and a comparison is made to the B1 alloy. Like the B1 alloy, the B21, B22, B23, and B24 alloys include Cu as a microstructure tuning element designed to achieve excellent low temperature characteristics as described in the '725 patent. The PCT isotherms were analyzed and the hysteresis associated with each of the alloys was determined. The conventional logarithmic measure of hysteresis is shown in the inset of FIG. 7 for each alloy at an absorption weight percent of 0.5. The maximum concentration difference (MCD) of each alloy was also obtained from the PCT plot and the following results were obtained and are shown below in Table 10, where MCD is expressed in units of weight percent (wt %) absorbed hydrogen:

TABLE 10

| Alloy | MCD |
|---|---|
| B | 0.06 |
| B1 | 0.20 |
| B12 | 0.33 |
| B21 | 0.06 |
| B22 | 0.09 |
| B23 | 0.09 |
| B24 | 0.13 |

MCD values for the B and B12 alloys were also determined and are shown for comparison purposes (the absorption and desorption isotherms for the B and B12 alloys are not included in FIG. 7). The results of this example indicate that the hysteresis of the instant B21, B22, B23, and B24 alloys is much lower than the hysteresis of the B1 and B12 alloys of the '725 patent. The hysteresis of the instant B21, B22, B23 and B24 alloys is comparable to the hysteresis of the B alloy. As a result, the cycle life characteristics of the instant B21, B22, B23, and B24 alloys are expected to be similar to those of the B alloy and better than those of the B1 and B12 alloys.

EXAMPLE 5

In this example, the PCT and hysteresis characteristics of several of the instant alloys are described. PCT curves are measured upon absorption and desorption of hydrogen at 30° C. and hysteresis is determined through a comparison of the absorption and desorption isotherms. Hysteresis is assessed primarily in terms of the maximum concentration difference described hereinabove. The conventional logarithmic ($\ln(P_a/P_d)$) measure of hysteresis may also be referred to. The alloys considered in this example include Zr as a cycle life enhancement element.

Figure 8:
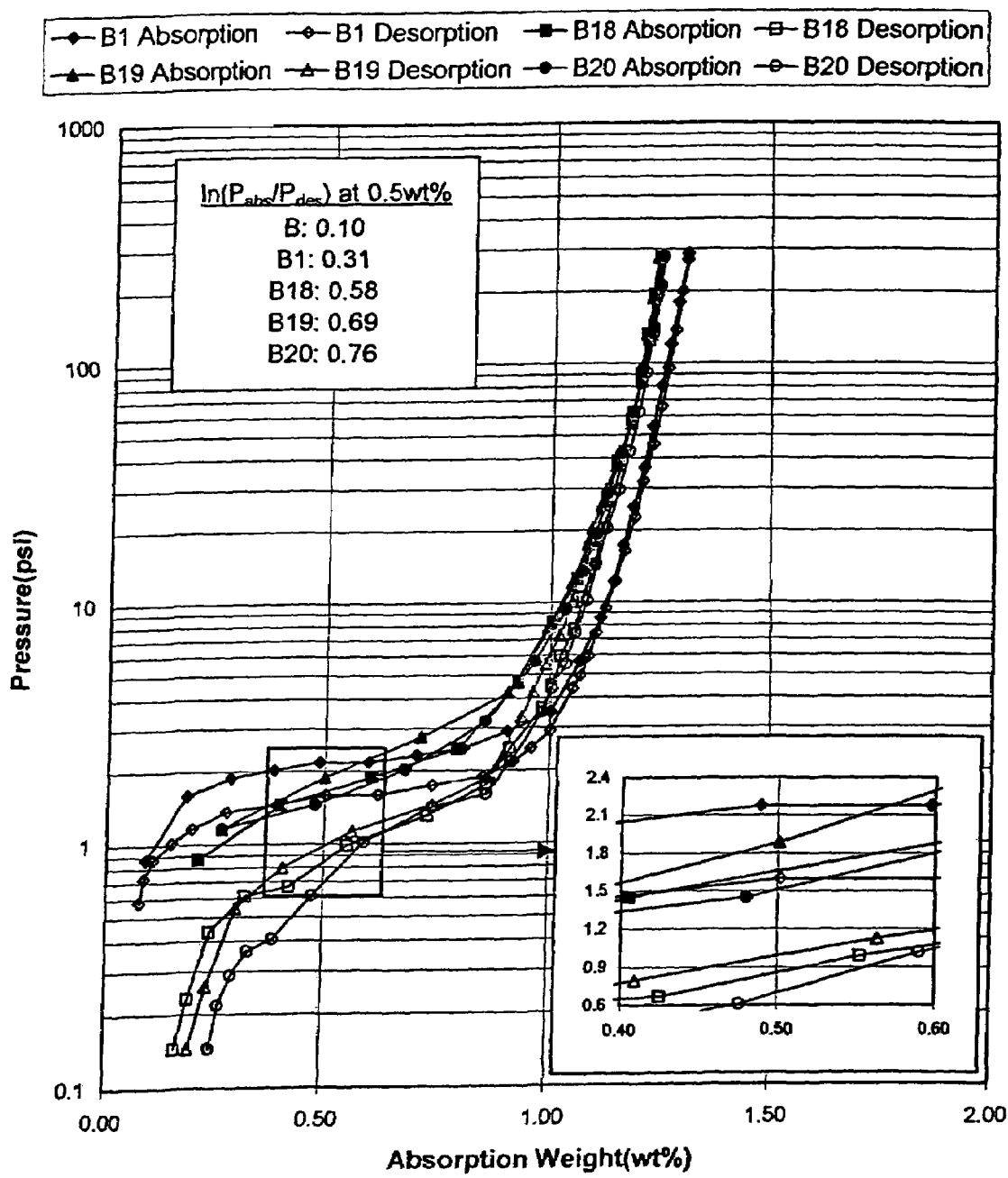
FIG. 8, shows a PCT plot of the B1, B21, B22, B23 and B24 alloys at 30° C.

FIG. 8 shows the PCT curves of the instant B18, B19, and B20 alloys at 30° C. The curves show the dependence of hydrogen pressure (plotted on a logarithmic scale) on the weight percent of absorbed hydrogen. Absorption and desorption isotherms are shown for each alloy and a comparison is made to the B1 alloy. Like the B1 alloy, the B18, B19, and B20 alloys include Cu as a microstructure tuning element designed to achieve excellent low temperature characteristics as described in the '725 patent. The PCT isotherms were analyzed and the hysteresis associated with each of the alloys was determined. The conventional logarithmic measure of hysteresis is shown in the inset of FIG. 8 for each alloy at an absorption weight percent of 0.5. The maximum concentration difference (MCD) of each alloy was also obtained from the PCT plot and the following results were obtained, where MCD is expressed in units of weight percent (wt %) absorbed hydrogen in Table 11 below:

TABLE 11

| Alloy | MCD |
| --- | --- |
| B | 0.06 |
| B1 | 0.20 |
| B12 | 0.33 |
| B18 | 0.17 |
| B19 | 0.20 |
| B20 | 0.22 |

MCD values for the B and B12 alloys are shown for comparison purposes. The results of this example indicate that the hysteresis of the instant B18, B19, and B20 alloys is comparable to that of the B1 alloy when using MCD as a measure of hysteresis and greater than that of the B1 alloy when using the conventional logarithmic measure of hysteresis. These results indicate that the cycle life characteristics of the instant B18, B19 and B20 alloys should be comparable to and not appreciable better than the cycle life characteristics of the B1 alloy. The hysteresis characteristics of the B18, B19 and B20 alloys are, however, improved relative to the B12 alloy according to the MCD measure of hysteresis.

The hysteresis observed for the B18, B19, and B20 alloys of this example is greater than the hysteresis observed for the B21, B22, B23, and B24 alloys described hereinabove. The greater hysteresis in this example is due to the higher Zr concentration present in the B18, B19 and B20 alloys relative to the B21, B22, B23, and B24 alloys. The instant inventors have determined that the beneficial hysteresis effects associated with Zr as a cycle life enhancement modifier occur preferentially within a particular range of Zr concentration. The results indicate that hysteresis effects are lowest for Zr concentrations up to about 0.5 at. % and that the hysteresis increases as the Zr concentration is increased above about 1.0 at. %.

X-ray diffraction measurements of the C20 alloy (which has 1.7 at. % Zr) indicate the presence of Zr-rich precipitates, while x-ray diffraction measurements of the C21 alloy (which has 0.5 at. % Zr) indicate the absence of Zr-rich precipitates. The x-ray diffraction results indicate that as the Zr concentration is increased, there is a tendency for Zr to nucleate out in a separate Zr-rich phase to produce a heterogeneous alloy. The instant PCT results indicate that precipitation of a Zr-rich phase increases hysteresis and is thus expected to deleteriously impact the cycle life characteristics of the alloy. It is accordingly preferable to include Zr at a concentration sufficient to reduce hysteresis, while minimizing the precipitation of Zr-rich phases. In a preferred embodiment, the metal hydride material is a homogeneous phase $AB_5$ material that comprises Zr.

In one embodiment herein, the Zr concentration is less than or equal to 1.7 at. %. In another embodiment herein, the Zr concentration is less than or equal to 1.1 at. %. In yet another embodiment herein, the Zr concentration is less than or equal to 0.5 at. %. In still another embodiment herein, the Zr concentration is less than or equal to 0.2 at. %. Preferred inclusive Zr concentration ranges include the ranges 0.2 at. %-1.7 at. %, 0.2 at. %-0.5 at. %, 0.5 at. %-1.1 at. %, and 0.2 at. %-1.1 at. %.

EXAMPLE 6

In this example, the PCT and hysteresis characteristics of several of the instant alloys are described. PCT curves are measured upon absorption and desorption of hydrogen at 30° C. and hysteresis is determined through a comparison of the absorption and desorption isotherms. Hysteresis is assessed primarily in terms of the maximum concentration difference described hereinabove. The conventional logarithmic ($\ln(P_a/P_d)$) measure of hysteresis may also be referred to. The alloys considered in this example include Si as a cycle life enhancement element.

Figure 9:
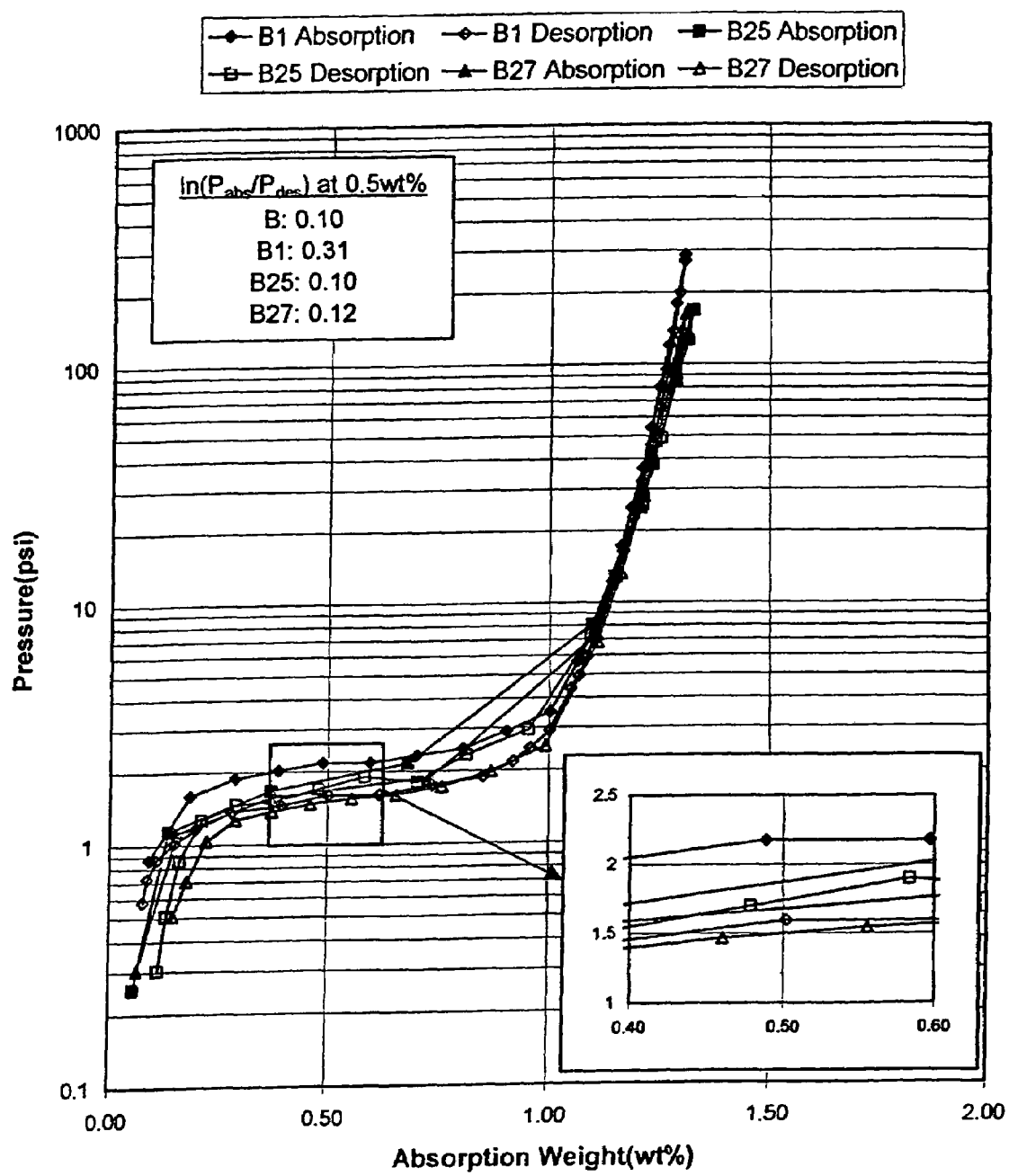
FIG. 9, shows a PCT plot of the B1, B25, and B27 alloys at 30° C.
Figure 10:
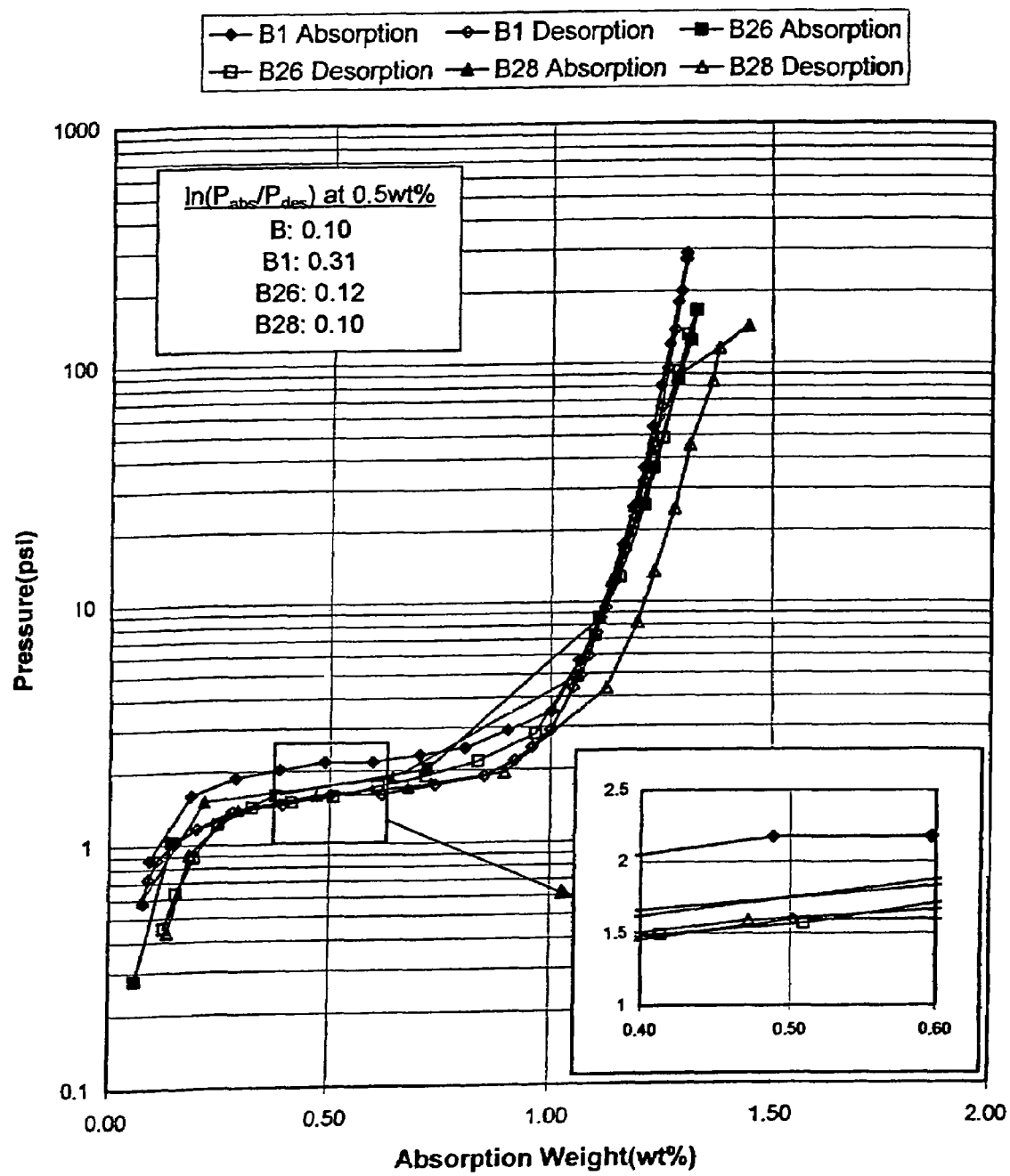
FIG. 10, shows a PCT plot of the B1, B26, and B28 alloys at 30° C.

FIGS. 9 and 10 show the PCT curves of the instant B25, B26, B27, and B28 alloys at 30° C. The curves show the dependence of hydrogen pressure (plotted on a logarithmic scale) on the weight percent of absorbed hydrogen. Absorption and desorption isotherms are shown for each alloy and a comparison is made to the B1 alloy. The B25 and B27 alloys both include 0.5 at. % Si and differ with respect to the Co and Cu concentration. The B25 alloy includes no Cu and a higher Co concentration than the B27 alloy. In the B27 alloy, some of the Co has been replaced by Cu. The B25 and B27 alloys are otherwise similar in composition. The B26 and B28 alloys both include 1.0 at. % Si and differ with respect to the Co and Cu concentration. The B26 alloy includes no Cu and a higher Co concentration than the B28 alloy. In the B28 alloy, some of the Co has been replaced by Cu. The B26 and B28 alloys are otherwise similar in composition.

The PCT isotherms were analyzed and the hysteresis associated with each of the alloys was determined. The conventional logarithmic measure of hysteresis is shown in the inset of FIGS. 9 and 10 for each alloy at an absorption weight percent of 0.5. The maximum concentration difference (MCD) of each alloy was also obtained from the PCT plot and the following results were obtained, where MCD is expressed in units of weight percent (wt %) absorbed hydrogen in Table 12 below:

TABLE 12

| Alloy | MCD |
| --- | --- |
| B | 0.06 |
| B1 | 0.20 |
| B12 | 0.33 |
| B25 | 0.13 |
| B26 | 0.13 |
| B27 | 0.09 |
| B28 | 0.12 |

MCD values for the B and B12 alloys are shown for comparison purposes. The results of this example indicate that the hysteresis of the instant B25, B26, B27, and B28 alloys is much lower than the hysteresis of the B1 and B12 alloys and comparable to the hysteresis of the B alloy.

These results indicate that the cycle life characteristics of the instant B25, B26, B27 and B28 alloys should be better than the cycle life characteristics of the B1 alloy.

This example shows that the inclusion of Si as a modifier reduces hysteresis and leads to the expectation that inclusion of Si will improve the cycle life characteristics. The alloys of this example are of further interest because the compositions considered involve the substitution of Cu for Co in the composition in the presence of Si as a cycle life enhancement modifier. As discussed in the '725 patent, one goal in producing metal hydride alloys, regardless of operating temperature, is a minimization of alloy cost. Co is one of the more expensive components in metal hydride alloys and it is desirable to minimize its concentration. It is generally believed in the art, however, that Co is an advantageous element because its presence leads to longer cycle life and improved cycle life characteristics. In several of the compositions described in the '725 patent, the amount of Co was reduced in an effort to lower the alloy cost and was replaced by Cu and other microstructure tuning elements in an effort to achieve superior low temperature performance characteristics. The alloys of this example show that substitution of Cu for Co in the presence of a cycle life enhancement element according to the instant invention provide low hysteresis, a condition indicative of good cycle life characteristics. Thus, deleterious effects associated with the removal of Co are compensated by the instant cycle life enhancement elements.

EXAMPLE 7

In this example, the particle size variation upon cycling of several of the instant alloys is presented. More specifically, the average particle size of the alloys after ten cycles of hydriding (absorption) and dehydriding (desorption) in the gas phase is given as a function of PCT hysteresis as measured by the maximum concentration difference. The experiment details are as follows: A piece of ingot (about 10 grams) from each composition in this study was placed into a hydrogen reactor. The reactor was first pumped and flushed with argon gas three times and the sample (ingot) was activated by cooling from 300° C. to room temperature under 50 psi hydrogen atmosphere. The sample was next subjected to 10 cycles of hydriding under 50 psi hydrogen atmosphere and dehydriding with a two-stage mechanical pump. Each cycle took about 5 hours to complete. After 10 gas phase cycles, the sample was moved to a laser particle size analyzer and a particle distribution curve was obtained. The average particle size was calculated by volume. The maximum concentration difference (MCD) values were obtained from the PCT curves of each sample.

The results obtained are given below in Table 13. The average particle size is expressed in units of microns and MCD is expressed in units of weight percent (wt. %) absorbed hydrogen.

TABLE 13

| Alloy | Average Particle Size (μm) | MCD (wt. %) |
|---|---|---|
| B | 22.45 | 0.075 |
| B0 | 18.28 | 0.28 |
| B1 | 16.68 | 0.315 |

TABLE 13-continued

| Alloy | Average Particle Size (μm) | MCD (wt. %) |
|---|---|---|
| B23 | 48.3 | 0.12 |
| B12 | 17.81 | 0.33 |
| B4 | 21.9 | 0.09 |
| B24 | 26.41 | 0.14 |
| B27 (1) | 21.12 | 0.16 |
| B26 | 25.56 | 0.13 |
| B27 (h) | 23.14 | 0.09 |
| C36 | 29.79 | 0.11 |
| C37 | 63.06 | ~0.0 |
| B36 | 19.2 | 0.14 |
| B37 | 19 | 0.16 |

The results of this example show that metal hydride materials having a large maximum concentration difference exhibit greater pulverization and particle size degradation on cycling and vice versa for materials having a small maximum concentration difference. The results demonstrate the reliability of hysteresis, as measured by MCD, for determining the cycle life characteristics of metal hydride alloys. The results further show that alloys including Zr and Si as modifiers exhibit less pulverization and particle size degradation, attributes that are conducive to long cycle life.

EXAMPLE 8

In this example, the cycle life of batteries that includes the instant B22, B23, and B24 alloys are compared to the cycle life of a control battery containing the B1 alloy. A standard commercial C-cell battery design was used in the comparison of this example. The battery design included a negative electrode containing one of the hydrogen storage alloys used in this example, a nickel hydroxide positive electrode, a separator and a KOH electrolyte. Four batteries were used in the cycle life comparison. Each battery included a different hydrogen storage alloy as the active material in the negative electrode, but the batteries were otherwise identical in construction. The cycle life of each battery was tested to examine the stability of the battery capacity upon repeated cycles of charging and discharging. Charging of each battery was completed at a C/2 rate with negative V as the method of charge termination. Under this method, charging was terminated when a 3 mV decrease in voltage was detected. Discharging of each battery was completed at a C/2 rate until the battery voltage decreased to 0.9 V. Each cycle of this example includes one charging step and one discharging step and is repeated until the battery capacity drops to less than 70% of its initial capacity.

Figure 11:
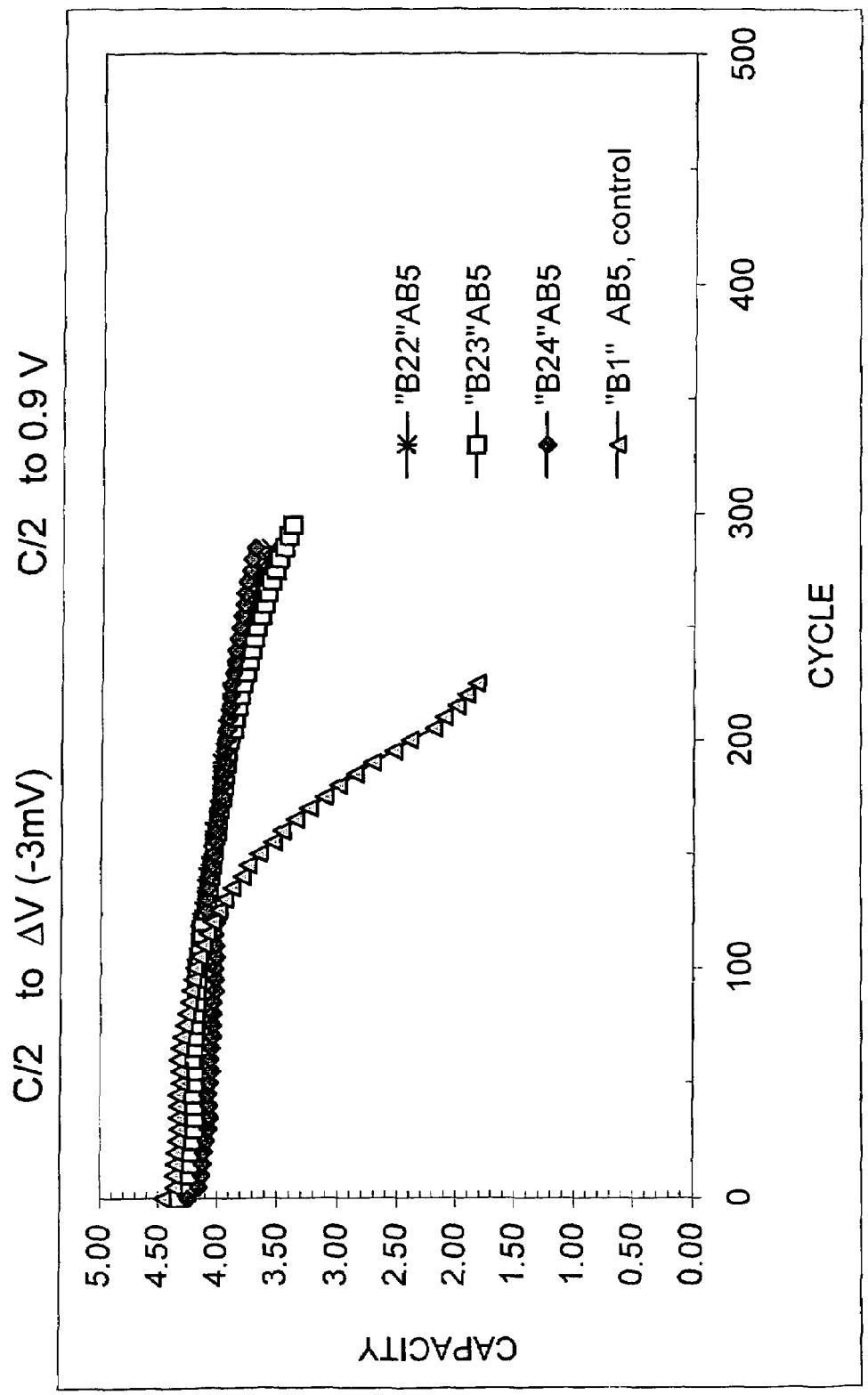
FIG. 11, shows the cycle life characteristics of the B1 alloy and the instant B23, B24, and B25 alloys.

The results of the cycle life tests are shown in FIG. 11 herein, which shows battery capacity (mA-h/g) as a function of cycle number. The cycle life testing shows a clear improvement in the cycle life characteristics of the B22, B23, and B24 alloys relative to the B1 alloy. Whereas the battery containing the B1 alloy has lost over 50% of its initial capacity by 200 cycles, batteries containing the B22, B23 and B24 alloys continue to exhibit ~75% or more of their initial capacity at 300 cycles. The results demonstrate that the instant cycle life enhancement elements improve cycle life characteristics in accordance with the discussion hereinabove.

EXAMPLE 9

In this example, low temperature performance characteristics of the instant B23 and B24 alloys are considered. The performance of a nickel metal hydride battery having a negative electrode containing the instant B23 and B24 alloys is described and compared to analogous batteries containing the B and B1 alloys as the negative electrode material. A nickel metal hydride C cell battery was constructed using each alloy and tested according to an HEV power test protocol. Except for the negative electrode material, the C cells were identical in design. Each C cell included a pasted negative electrode comprising one of the four alloys (B, B1, B23, and B24), a nickel hydroxide positive electrode on a nickel foam substrate, a KOH electrolyte and a fluorinated polypropylene/polyethylene separator. The specific power of each battery was measured using an HEV power test at 35° C. and −30° C. for state of charge (SOC) values of 100%, 80%, 50%, and 20%. Each state of charge (SOC) was reached by first charging to 100% SOC and then discharging at the C rate to the desired SOC. (The C rate corresponds to the discharge rate required to fully discharge the cell in one hour. The C rate of a 4 A-h battery, for example, is 4 A.) As the discharging at the C rate was concluding, the voltage of the battery at the C rate current was measured for each SOC to obtain an initial voltage and current at each SOC. The initial voltage and current are subsequently used in determining the specific power upon further discharge from the SOC. This further discharge of the battery from each SOC was accomplished by applying a 10 sec, 10 C current pulse to the battery. At the end of the pulse, the voltage of the battery was measured. The specific power was then computed. The specific power computation included a calculation of $\Delta V/\Delta I$, relative to the initial voltage and current, to obtain a resistance, as well as determinations of the open circuit voltage ($V_{oc}$) and maximum current ($I_{max}$) of the battery. The specific powers reported in this example were calculated by computing the product ($2/3\ V_{oc}$)($1/3\ I_{max}$) and normalizing to mass.

The results of the HEV power test at SOC values of 100%, 80%, 50% and 20% are shown in FIG. 12 herein. The specific power of the four different batteries are shown, using the symbols indicated-in FIG. 12 for batteries based on the B, B1, B23, and B24 alloys. At 35° C., the specific powers of the four batteries are comparable. The battery based on the B1 alloy exhibits a slightly higher specific power than the batteries based on the B, B23 and B24 alloys. All of the batteries, however, show acceptable specific power at 35° C. over a wide range of SOC.

At −30° C., the batteries based on the B23 and B24 alloys show markedly superior performance. The battery based on the conventional B alloy loses all power when the SOC is reduced to 80%. The battery based on the B1 alloy shows the highest power at 100% and 80% SOC, but rapidly loses power as the SOC is further reduced. At 50% SOC, the specific power of the battery based on the B1 alloy is essentially zero. Batteries based on the instant B23 and B24 alloys, in contrast exhibit specific powers above 150 W/kg at 50% SOC and continue to deliver power down to 20% SOC.

In a further demonstration of the suitability of the instant alloys for HEV applications, the instant inventors constructed nickel metal hydride battery modules and determined the specific peak power thereof. Separate modules utilizing the B, B1, B12, B23 and B24 alloys were constructed. The alloys were fabricated into negative electrodes and included in cells that were interconnected to form the modules. Each module included ten interconnected cells in a water-cooled sealed prismatic design with a nominal C-rate capacity of 9 Ah. For each module, the specific peak power (in units of W/kg) was measured at 35° C. using a 100 A current pulse applied for 10 sec. The results are summarized in Table 14 below:

TABLE 14

| Alloy | Weight (kg) | Specific Peak Power (W/kg) | C-rate Capacity (Ah) |
| --- | --- | --- | --- |
| B | 2.470 | 935 | 8.9 |
| B1 | 2.450 | 1237 | 8.9 |
| B12 | 2.385 | 1373 | 9.0 |
| B23 | 2.462 | 1131 | 8.7 |
| B24 | 2.450 | 1135 | 8.7 |

The specific peak power results for the sealed prismatic HEV modules show that the modules that include the instant B23 and B24 alloys exhibit significantly improved peak powers relative to the module based on the conventional B alloy. The B1 and B12 modules exhibited the greatest peak powers, but as described hereinabove, these alloys are susceptible to cycle life degradation. The high specific powers of the B23 and B24 modules in combination with the improved cycle life characteristics described hereinabove make these alloys on balance a superior choice for HEV applications.

EXAMPLE 10

In this example, the half-cell capacity of electrodes fabricated from several of the instant alloys was determined. The half-cell capacity is a measure of the intrinsic ability of an electrode material to store hydrogen in an electrochemical reaction. Each test electrodes was fabricated by pressing an alloy powder onto an expanded nickel substrate without utilizing a binder. Test electrodes were prepared from the B, B0, B1, B12, B21, B22, B23, B24, B25, B26, B27, and B28 alloys. Each of the test electrodes was tested in an electrochemical cell that included an over-capacity, partially charged Ni(OH)$_2$ counterelectrode and a 30% KOH electrolyte. In the half-cell capacity test, the voltage between the test electrode and counterelectrode was recorded. The half-cell capacity was measured using a constant current charge-discharge station. The charge rate was 100 mA/g for 6 hours and separate tests using different discharge rates (50 mAh/g and 5 mAh/g) were completed. The half-cell capacities measured at the two discharge rates were averaged and are reported in Table 15 below:

TABLE 15

| Alloy | Half Cell Capacity (mAh/g) |
| --- | --- |
| B | 327 |
| B0 | 316 |
| B1 | 325 |
| B12 | 314 |
| B21 | 304 |
| B22 | 307 |
| B23 | 302 |
| B24 | 304 |
| B25 | 319 |
| B26 | 318 |
| B27 | 303 |
| B28 | 289 |

The half-cell capacity results indicate that the instant alloys compare favorably to conventional alloys. The similar half-cell capacities of the instant alloys with established alloys are indicative of their suitability for batteries and other electrochemical hydrogen storage applications. The half-cell capacities of the instant alloys attest to their favorable hydrogen storage capabilities and functionality as hydrogen storage alloys. In one embodiment herein, the half-cell capacity of the instant alloys is at least 100 mAh/g. In a preferred embodiment, the half-cell capacity is at least 200 mAh/g. In a more preferred embodiment, the half-cell capacity is at least 300 mAh/g.

EXAMPLE 11

In this example, the charge transfer resistances and double layer capacitances of roll-compacted electrodes that include the instant B21, B22, B23, and B24 alloys are compared to an analogous electrode that includes the B1 alloy at −30° C. The B1 alloy was selected as a basis of comparison because of the superior low temperature characteristics demonstrated for it in the '725 patent.

The charge transfer resistance (RCT) and double layer capacitance (Cdl) of the batteries were obtained through complex impedance measurements. The impedance measurements were completed using an electrochemical cell that included a mercury/mercury oxide reference electrode, a nickel hydroxide counter electrode, a working electrode that included one of the B1, B21, B22, B23 or B24 alloys, and a 30% KOH electrolyte. Impedance measurements were completed at 23° C. and −30° C.

Figure 13:
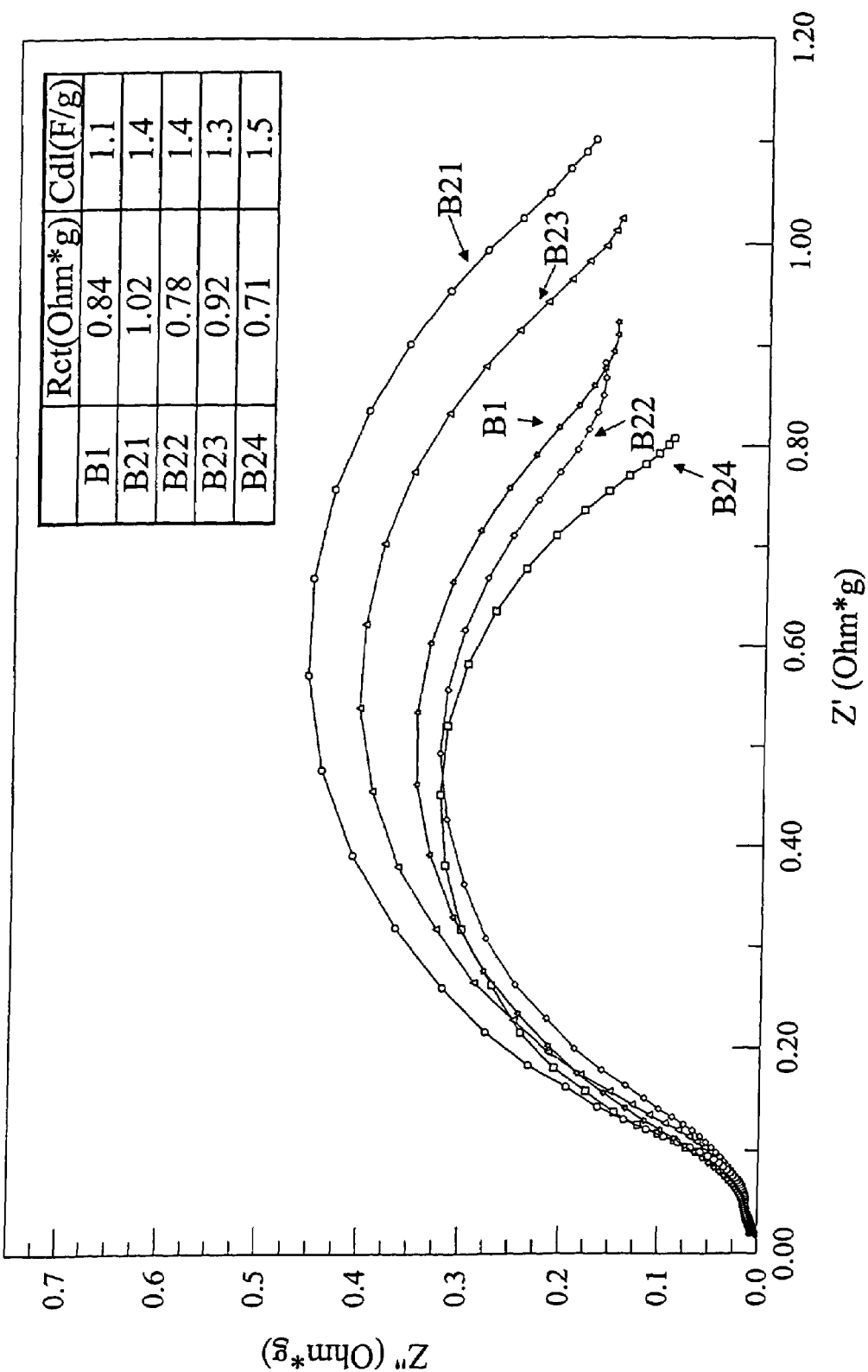
FIG. 13, shows a comparison of the complex impedance plots at –30° C. of compacted electrodes that include the B1 and instant B21, B22, B23, and B24 alloys.

The results of the measurements at −30° C. are presented in FIG. 13 herein which shows the imaginary part Z″ of the complex impedance as a function of the real part Z′ of the complex impedance. The curves are labeled according to the alloy used as the negative electrode material. Each curve includes a semi-circular portion and an upwardly sloping portion. The intercept of each curve with the Z′ axis provides the Ohmic resistance of each battery. The charge transfer resistance can be determined from the diameter of the semicircular portion of each curve and the slope of the upwardly sloping portion of each curve is related to the diffusion resistance. The double layer capacitance can be obtained from the standard electrochemical equations used in the analysis of the semicircular portion of each curve. The values of RCT and Cdl computed from the complex impedance curve of each alloy are shown in the inset of FIG. 13. In one embodiment herein, the charge transfer resistance is less than 2 ohm-g. In a preferred embodiment, the charge transfer resistance is less than 1.5 ohm-g. In a more preferred embodiment, the charge transfer resistance is less than 1 ohm-g. The results show that the charge transfer resistances RCT of the five alloys are similar.

Since the electrochemical cell used in the measurements were analogous except for the choice of negative electrode material, the value of RCT is indicative of differences in the kinetics of the charge transfer reaction that occurs at the negative electrode for the different alloy materials. As described in the '725 patent, the charge transfer resistance associated with B1 alloy is lower than that associated with a conventional commercial B alloy and as a result, the charge transfer reaction at the B1 electrode proceeds with faster kinetics than the charge transfer reaction at the B electrode. The results of this example show that similarly favorable charge transfer characteristics are associated with the instant alloys at −30° C. The faster kinetics relative to conventional alloys indicate a more favorable electrochemical reaction and suggest that the instant alloys benefit from the effects associated with a greater porosity for the support matrix surrounding the catalytic metallic particles and/or a greater number density of catalytic metallic particles in the interface region as described in the '725 patent. Low charge transfer resistance is conducive to improved power capability.

Electrodes based on the instant B21, B22, B23 and B24 alloys exhibit a larger double layer capacitance than the electrode based on the B1 alloy. Since the double layer capacitance is indicative of the surface area over which an electrochemical reaction occurs and since high surface area is conducive to greater electrochemical reactivity, the results of this example indicate that the low temperature electrochemical reactivity of the instant B21, B22, B23, and B24 alloys is better than that of the B1 alloys. The measurements at 23° C. indicate that the B21, B22, B23, and B24 alloys have comparable charge transfer resistances and double layer capacitances to the B1 alloy. The performance of the instant alloys at 23° C. is thus not compromised relative to the B1 alloy. The results of this example therefore demonstrate that the instant alloys maintain low temperature characteristics that are comparable to or superior to those of the B1 alloys while retaining similar room temperature characteristics. In particular, the complex impedance results of this example indicate faster discharge kinetics and higher specific powers at low operating temperatures for batteries that include negative electrodes containing the instant alloys.

EXAMPLE 12

In this example, the pore resistances of the instant B21, B22, B23, and B24 alloys are presented and compared to that of the B1 alloy. Pore resistance is a measure of the facility of electrochemical reaction within a porous electrode material. It is influenced by factors such as the volume and/or dimensions of voids or channels present within the electrode material. Voids and channels provide the pathways needed for the migration or diffusion of electrochemically reactive species within the electrode material. Accessibility of electrochemically reactive species to the catalytic sites within a metal hydride electrode is necessary for efficient charging and discharging of the electrode. Pore resistance provides a measure of the mobility of electrochemical species within the metal hydride material and provides an indication of the expected efficiency of electrochemical reaction. A low pore resistance signifies high mobility of electrochemical species and is conducive to fast reaction kinetics and efficient reactions.

In the '725 patent, the pore resistances of the B1 and B12 alloys were determined and shown to be much lower at −30° C. and −5° C. than the pore resistance of a conventional B0 alloy. This finding evidences the superior low temperature performance of the B1 and B12 alloys of the '725 patent relative to conventional commercial alloys such as the B0 alloy. In this example, the pore resistance of the B21, B22, B23, and B24 alloys is determined and compared to that of the B1 alloy.

Figure 14:
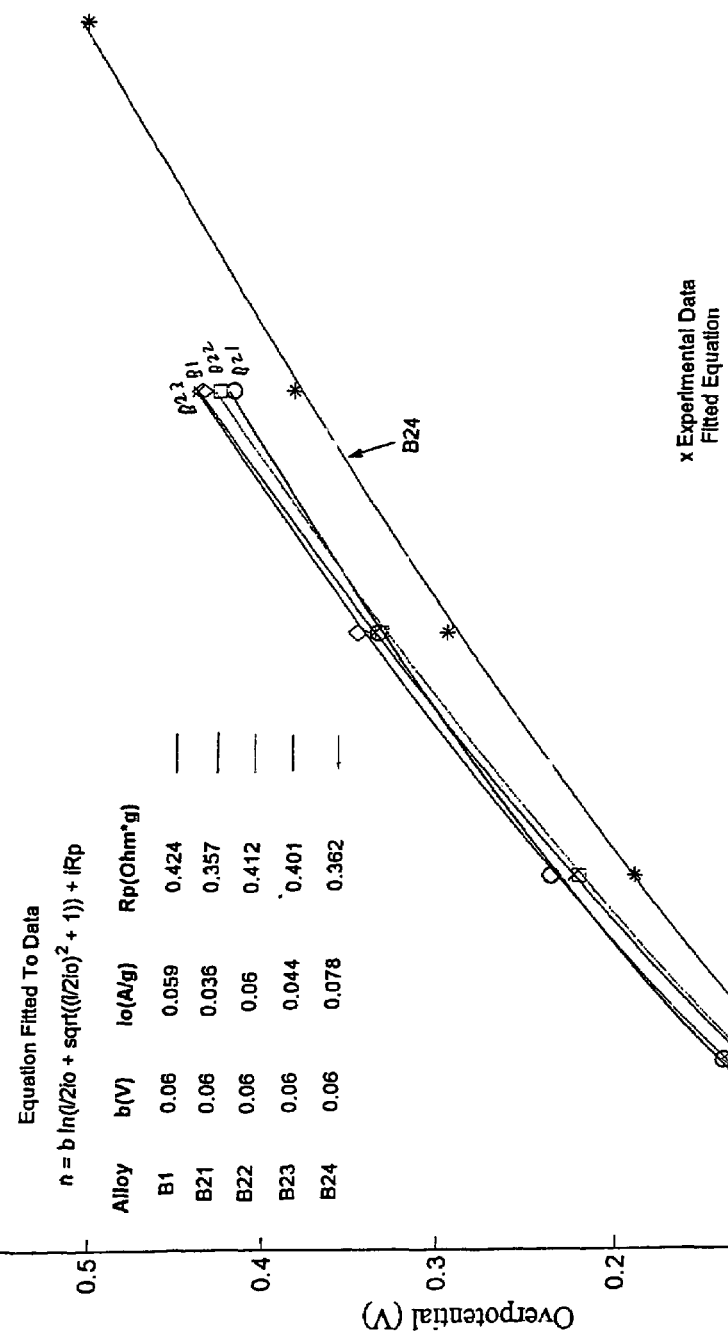
FIG. 14, shows a comparison of the overpotential as a function of discharge current at −30° C. of compacted electrodes that include the B1, and instant B21, B22, B23, and B24 alloys.

The pore resistance was obtained from measurements of the polarization curves of electrodes fabricated from different metal hydride electrodes. Separate electrodes were fabricated using the B1, B21, B22, B23, and B24 alloys. The polarization curves of the five alloys are shown in FIG. 14. The polarization curves were obtained at 80% SOC by pulsating the electrodes to different currents (at 80% SOC) and measuring the electrode potential (relative to a Hg/HgO reference electrode in an electrochemical cell that also included a nickel hydroxide counter electrode and a KOH electrolyte) 10 seconds after initiation of the pulse. The potential measured is referred to as the overpotential of the electrode and is plotted as a function of current pulse amplitude in FIG. 14. The overpotential is a measure of the displacement of an electrode from its equilibrium potential in response to an applied current. A lower overpotential at a given applied current generally indicates greater facility (e.g. faster kinetics, less energy dissipation) of a particular electrochemical reaction.

Analysis of the overpotential variation with current was completed using a modified form of the Butler-Volmer equation that accounts for porosity. Conventionally, Butler-Volmer analysis of electrode overpotential is based on a smooth electrode approximation in which the sites of electrochemical reactivity are located directly at the electrode surface so that the electrode presents no mobility barriers to reaction. In the instant electrodes, however, the surfaces are not smooth, but rather are porous, with barriers to mobility as described hereinabove. Consequently, it is desired to include the effects of porosity on the overpotential. The modified form of the Butler-Volmer equation adapted for analysis of the overpotential data of this example is the following:

$$\eta = b \ln\left[\frac{i}{2i_0} + \sqrt{\left(\frac{i}{2i_0}\right)^2 + 1}\right] + iR_p$$

where $\eta$ is the overpotential, b is a Tafel constant (divided by 2.3 to account for a transformation from common to natural logarithms), $i_0$ is the exchange current density, i is the applied current density, and $R_p$ is the pore resistance. The term $iR_p$ accounts for the contribution of the pore resistance to the overpotential.

The value of $R_p$ reflects the influence of porosity on overpotential at a particular current. The value of $R_p$ is determined by the microstructure of the electrode material and the characteristics of the electrochemically relevant species that must penetrate the microstructure in order to effect reaction. An open, porous microstructure provides little inhibition to the mobility of chemical species at or in the vicinity of the electrode surface and/or catalytic sites of reactivity or to the mobility of conductive ionic species through the electrode. As a result, a porous microstructure is conducive to a small pore resistance. A dense microstructure, particularly one that has sites of electrochemical reactivity away from the surface, provides a substantial barrier to mobility and is conducive to a large pore resistance. For a particular microstructure, pore resistance may also depend on the size, shape, charge and other characteristics of the electrochemically relevant species that must penetrate the microstructure in order to undergo reaction.

The overpotential as a function of current data presented in FIG. 14 was fit using the above equation. The results of the fits are indicated as solid curves in FIG. 14. The fitting provides values of the Tafel constant, exchange current density and pore resistance (in units of ohm-g) of each electrode at the three measurement temperatures. The pore resistance results are summarized below in Table 16:

TABLE 16

| Electrode Alloy | Temperature | Rp (Ω-g) |
|---|---|---|
| B1 | −30° C. | 0.424 |
| B23 | −30° C. | 0.357 |
| B22 | −30° C. | 0.412 |

TABLE 16-continued

| Electrode Alloy | Temperature | Rp (Ω-g) |
|---|---|---|
| B23 | −30° C. | 0.401 |
| B24 | −30° C. | 0.362 |

The pore resistance results indicate that the pore resistances of electrodes based on the instant alloys are lower than the pore resistance of an electrode based on the B1 alloy. The lower pore resistance of the instant alloys indicates that electrochemical reactions of the alloys occur at least as favorably as electrochemical reactions of the B1 alloy. The lower pore resistance indicates a lower mobility barrier and greater accessibility for electrochemically active species with respect to the catalytic metallic particles of the instant alloys as well as a lower mobility barrier for conductive ionic species within or through electrodes formed from the instant alloys. In one embodiment herein, the pore resistance at −30° C. is less than 1 ohm-g. In a preferred embodiment, the pore resistance at −30° C. is less than 0.75 ohm-g. In a more preferred embodiment, the pore resistance at −30° C. is less than 0.5 ohm-g.

EXAMPLE 13

In this example, the surface metallic nickel content of the instant B21, B22, B23 and B24 alloys is measured and compared to the metallic nickel content of the B and B1 alloys. As described in the '725 patent and references incorporated by reference therein and herein, the performance of metal hydride materials is promoted through the formation of a high density of catalytic nickel (or other metal or metal alloy) particles in the interface region of a metal hydride or hydrogen storage material. A high density of catalytic nickel particles in combination with a high porosity for the support matrix surrounding the catalytic nickel particles promotes electrochemical (or thermal) reactivity by improving access of reactant species to and product species away from catalytic sites and by providing a large number of such sites. These effects are described in the '725 patent and are enhanced through an accelerated and directed preferential corrosion effect described therein. Also, as described hereinabove and in the '088 patent, the density of catalytic nickel particles may also be increased through activation.

The catalytic nickel particles are comprised of metallic nickel atoms and can be quantified indirectly through a magnetic susceptibility measurement. The magnetic susceptibility measurements of this example were completed with a MicroMag 2900 alternating gradient magnetometer from Princeton Measurements Corporation. Since the magnetic susceptibility of bulk $AB_5$ alloys are typically very small compared to that from metallic nickel created when surface oxide was formed, the magnetic susceptibility can be used as an indirect measurement of surface metallic nickel where a higher surface metallic nickel concentration correlates with a higher magnetic susceptibility. Samples of the alloys were etched with 60% KOH water solution at 100° C. for two hours before the measurement. The curve of saturated magnetic momentum vs. applied magnetic field can be fit with an analytic model to determine the magnetic domain size.

Magnetic susceptibility measurements (in units of memu/g) along with determinations of the average cluster size (in units of Å) of the metallic nickel particles in the surface region and the density (uncalibrated (relative units)) of the metallic Ni clusters (particles) in the surface region are summarized in the table below in Table 17:

TABLE 17

| Alloy | Mag. Susc. (memu/g) | Average Cluster Size (Å) | Cluster Density (uncalibrated) |
|---|---|---|---|
| B | 98 | 73 | 25.2 |
| B1 | 285 | 75 | 67.6 |
| B12 | 222 | 89 | 31.5 |
| B21 | 356 | 57 | 192.2 |
| B22 | 496 | 133 | 21.1 |
| B23 | 547 | 127 | 26.7 |
| B24 | 501 | 160 | 12.2 |

The magnetic susceptibility results indicate that the instant alloys contain a higher amount of metallic nickel than the conventional B alloy and the B1 and B12 alloys of the '725 patent. Inclusion of the instant cycle life enhancement elements is thus shown to facilitate the formation of metallic nickel and to increase the density of catalytic nickel particles commensurately. In one embodiment herein, the magnetic susceptibility is greater than 250 memu/g. In a preferred embodiment, the magnetic susceptibility is greater than 400 memu/g. In a more preferred embodiment, the magnetic susceptibility is greater than 525 memu/g.

The instant invention provides thermal and electrochemical hydrogen storage materials as well as electrodes, batteries, fuel cells etc. constructed therefrom that offer superior power, especially at low temperatures, and excellent cycle life. A reduction in cost is an added benefit of the instant alloys as excellent cycle life characteristics are obtained while minimizing the Co content of the alloys. Replacement of Co is desirable since Co is one of the most expensive components in practical $AB_5$ alloys. Co has typically been included in prior art alloys to suppress pulverization and improve the cycle life. In several of the instant alloys, a low temperature power enhancement element such as Cu replaces a portion of the Co present in an $AB_5$ composition and the deleterious effect of reducing the Co content on cycle life is ameliorated by inclusion of a cycle life enhancement element such as Zr or Si. The cycle life enhancement element improves alloy performance by reducing hysteresis (measured, for example, through the maximum concentration difference of the alloy) and pulverization as described hereinabove. In a preferred embodiment, the maximum concentration difference is less than 0.25 wt. % absorbed hydrogen. In another preferred embodiment, the maximum concentration difference is less than 0.20 wt. % absorbed hydrogen. In a more preferred embodiment, the maximum concentration difference is less than 0.15 wt. % absorbed hydrogen. In a most preferred embodiment, the maximum concentration difference is less than 0.10 wt. % absorbed hydrogen. The instant alloys thus simultaneously exhibit excellent low temperature power characteristics, excellent cycle life, and reduced Co content. In a preferred embodiment, the Co concentration does not exceed 9 at. %. In a more preferred embodiment, the Co concentration does not exceed 7 at. %. In most preferred embodiment, the Co concentration does not exceed 5 at. %.

The low hysteresis, low pulverization and long cycle life characteristics of the instant alloys arise from the low mass concentration difference of the materials. It is of course a requirement of the instant invention that the instant alloys absorb hydrogen so that non-absorbing materials are outside of the scope of the instant invention even though they may have a low (or zero) mass concentration difference. A zero value of the mass concentration difference may occur in the ideal situation of a hydrogen absorbing material exhibiting no activation barrier to the incorporation of hydrogen as well as in a non-functioning (i.e. non-hydrogen absorbing) material. Other characteristics such as power, half-cell capacity, activation, magnetic susceptibility, cycle life, battery capacity etc. as described hereinabove denominate functional hydrogen absorbing materials. In one embodiment herein, the mass concentration difference is greater than zero. Functional and non-functional hydrogen storage alloys may further be distinguished through the maximum reversible hydrogen storage concentration described hereinabove. Non-functional alloys have a negligible maximum reversible hydrogen storage concentration, while functional alloys have an appreciable hydrogen storage concentration.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

The invention claimed is:

1. A hydrogen storage alloy having a bulk region and an interface region, said interface region comprising catalytic metallic particles supported by a support matrix and voids, said catalytic metallic particles having diameters of less than about 100 Å, said catalytic metallic particles and said voids being distributed throughout said interface region, wherein the volume fraction of said voids in said interface region is greater than 5%, said hydrogen storage alloy also having a c/a lattice constant ratio greater than or equal to 0.805.

2. The hydrogen storage alloy according to claim 1, wherein said hydrogen storage alloy is non-stoichiometric.

3. The hydrogen storage alloy according to claim 1, wherein said hydrogen storage alloy has a pseudo B/A ratio in the range of 4.80 to 5.20.

4. The hydrogen storage alloy according to claim 3, wherein said hydrogen storage alloy has a pseudo B/A ratio in the range of 4.90 to 5.10.

5. The hydrogen storage alloy according to claim 4, wherein said hydrogen storage alloy has a pseudo B/A ratio in the range of 4.95 to 5.05.

6. The hydrogen storage alloy according to claim 1, wherein said c/a lattice constant ratio is greater than or equal to 0.809.

7. The hydrogen storage alloy according to claim 1, wherein the hysteresis of said hydrogen storage alloy is less than or equal to 0.12.

8. The hydrogen storage alloy according to claim 1, wherein said hydrogen storage alloy has the formula $AB_xCu_y$, wherein,
A is one or more elements selected from La, Ce, Pr, Nd, Mm, and other rare earth elements;
B is one or more elements selected from Ni, Mn, Co, Al, Cr, Ag, Pd, Rh, Sb, V, and Pt;
$4.8 \leq x \leq 5.2$; and
$0.01 \leq y \leq 0.35$.

9. The hydrogen storage alloy according to claim 8, wherein the percentage of Ni transferred to A-sites from B-sites versus the total amount of Cu contained in said hydrogen storage alloy is at least 35 percent.

10. The hydrogen storage alloy according to claim 9, wherein the percentage of Ni transferred to A-sites from B-sites versus the total amount of Cu contained in said hydrogen storage alloy is at least 45 percent.

11. The hydrogen storage alloy according to claim 8, wherein the atomic ratio of copper to component B in said hydrogen alloy is in the range of 0.01 to 0.20.

12. The hydrogen storage alloy according to claim 11, wherein the atomic ratio of copper to component B in said hydrogen storage alloy is in the range of 0.01 to 0.06.

13. The hydrogen storage alloy according to claim 8, wherein
A comprises 60 to 65 atomic percent La, 24 to 28 atomic percent Ce, 2 to 4 atomic percent Nd, and 6 to 10 atomic percent Pr;
B comprises 78 to 84 atomic percent Ni, 4 to 8 atomic percent Co, 5 to 9 atomic percent Mn, and 4 to 8 atomic percent Al; and
$0.18 \leq y \leq 0.30$.

14. The hydrogen storage alloy according to claim 8, wherein $0.15 \leq y \leq 0.30$.

15. The hydrogen storage alloy according to claim 8, wherein $4.95 \leq x \leq 5.05$.

16. An electrochemical cell comprising:
a negative electrode including an anode active material including a hydrogen storage alloy having a bulk region and an interface region, said interface region comprising catalytic metallic particles supported by a support matrix and voids, said catalytic metallic particles having diameters of less than about 100 Å, said catalytic metallic particles and said voids being distributed throughout said interface region, wherein the volume fraction of said voids in said interface region is greater than 5%, said hydrogen storage alloy also having a c/a lattice constant ratio greater than or equal to 0.805 and/or a hysteresis less than or equal to 0.12.

17. The electrochemical cell according to claim 16, wherein said electrochemical cell provides at least 20% of the peak power measured at 35° C. at temperatures less than or equal to −30° C.

18. The hydrogen storage alloy according to claim 16, wherein said hydrogen storage alloy is non-stoichiometric.

19. The hydrogen storage alloy according to claim 16, wherein said hydrogen storage alloy has a pseudo B/A ratio in the range of 4.80 to 5.20.

20. The electrochemical cell according to claim 16, wherein said non-stoichiometric hydrogen storage alloy has a pseudo B/A ratio in the range of 4.90 to 5.10.

21. The electrochemical cell according to claim 20, wherein said non-stoichiometric hydrogen storage alloy has a pseudo B/A ratio in the range of 4.95 to 5.05.

22. The hydrogen storage alloy according to claim 16, wherein said C/A lattice constant ratio is greater than or equal to 0.809.

23. The electrochemical cell according to claim 16, wherein said non-stoichiometric hydrogen storage alloy has the formula $AB_xCu_y$, wherein,
A is one or more elements selected from La, Ce, Pr, Nd, and Mm;
B is one or more elements selected from Ni, Mn, Co, Al, Cr, Ag, Pd, Rh, Sb, V, and Pt;
$4.8 \leq x \leq 5.2$; and
$0.01 \leq y \leq 0.35$.

24. The electrochemical cell according to claim 23, wherein the percentage of Ni transferred to A-sites from B-sites versus the total amount of Cu contained in said non-stoichiometric hydrogen storage alloy is at least 35 percent.

25. The electrochemical cell according to claim 24, wherein the percentage of Ni transferred to A-sites from B-sites versus the total amount of Cu contained in said non-stoichiometric hydrogen storage alloy is at least 45 percent.

26. The electrochemical cell according to claim 23, wherein the atomic ratio of copper to component B in said non-stoichiometric hydrogen storage alloy is in the range of 0.01 to 0.20.

27. The electrochemical cell according to claim 26, wherein the atomic ratio of copper to component B in said non-stoichiometric hydrogen storage alloy is in the range of 0.01 to 0.06.

28. The electrochemical cell according to claim 23, wherein
A comprises 60 to 65 atomic percent La, 24 to 28 atomic percent Ce, 2 to 4 atomic percent Nd, and 6 to 10 atomic percent Pr;
B comprises 78 to 84 atomic percent Ni, 4 to 8 atomic percent Co, 5 to 9 atomic percent Mn, and 4 to 8 atomic percent Al; and
$0.18 \leq y \leq 0.30$.

29. The electrochemical cell according to claim 23, wherein $0.15 \leq y \leq 0.30$.

30. The electrochemical cell according to claim 23, wherein $4.95 \leq x \leq 5.05$.

31. A hydrogen storage alloy having a bulk region and an interface region, said interface region comprising catalytic metallic particles supported by a support matrix and voids, said catalytic metallic particles having diameters of less than about 100 Å, said catalytic metallic particles and said voids being distributed throughout said interface region, wherein the volume fraction of said voids in said interface region is greater than 5%, said hydrogen storage alloy also having a hysteresis less than or equal to 0.12.

32. The hydrogen storage alloy according to claim 31, wherein said hydrogen storage alloy is non-stoichiometric.

33. The hydrogen storage alloy according to claim 31, wherein said hydrogen storage alloy has a pseudo B/A ratio in the range of 4.80 to 5.20.

34. The hydrogen storage alloy according to claim 33, wherein said hydrogen storage alloy has a pseudo B/A ratio in the range of 4.90 to 5.10.

35. The hydrogen storage alloy according to claim 34, wherein said hydrogen storage alloy has a pseudo B/A ratio in the range of 4.95 to 5.05.

36. The hydrogen storage alloy according to claim 31 having a c/a lattice constant ratio greater than or equal to 0.805.

37. The hydrogen storage alloy according to claim 31, wherein said c/a lattice constant ratio is greater than or equal to 0.809.

38. The hydrogen storage alloy according to claim 31, wherein said hydrogen storage alloy has the formula $AB_xCu_y$, wherein,
A is one or more elements selected from La, Ce, Pr, Nd, Mm, and other rare earth elements;
B is one or more elements selected from Ni, Mn, Co, Al, Cr, Ag, Pd, Rh, Sb, V, and Pt;
$4.8 \leq x \leq 5.2$; and
$0.01 \leq y \leq 0.35$.

39. The hydrogen storage alloy according to claim 38, wherein the percentage of Ni transferred to A-sites from B-sites versus the total amount of Cu contained in said hydrogen storage alloy is at least 35 percent.

40. The hydrogen storage alloy according to claim 39, wherein the percentage of Ni transferred to A-sites from B-sites versus the total amount of Cu contained in said hydrogen storage alloy is at least 45 percent.

41. The hydrogen storage alloy according to claim 38, wherein the atomic ratio of copper to component B in said hydrogen alloy is in the range of 0.01 to 0.20.

42. The hydrogen storage alloy according to claim 41, wherein the atomic ratio of copper to component B in said hydrogen storage alloy is in the range of 0.01 to 0.06.

43. The hydrogen storage alloy according to claim 38, wherein

A comprises 60 to 65 atomic percent La, 24 to 28 atomic percent Ce, 2 to 4 atomic percent Nd, and 6 to 10 atomic percent Pr;

B comprises 78 to 84 atomic percent Ni, 4 to 8 atomic percent Co, 5 to 9 atomic percent Mn, and 4 to 8 atomic percent Al; and $0.18 \leq y \leq 0.30$.

44. The hydrogen storage alloy according to claim 38, wherein $0.15 \leq y \leq 0.30$.

45. The hydrogen storage alloy according to claim 38, wherein $4.95 \leq x \leq 5.05$.

* * * * *